United States Patent
Yutkowitz

[11] Patent Number: 6,060,854
[45] Date of Patent: May 9, 2000

[54] METHOD AND APPARATUS FOR COMPENSATING FOR WINDUP IN A MACHINE

[75] Inventor: Stephen J. Yutkowitz, Cincinnati, Ohio

[73] Assignee: Vickers, Inc., Maumee, Ohio

[21] Appl. No.: 09/190,368

[22] Filed: Nov. 12, 1998

[51] Int. Cl.[7] .................................................. G05B 13/04
[52] U.S. Cl. ........................ 318/632; 318/574; 318/630; 318/631
[58] Field of Search ..................................... 318/569, 574, 318/575, 625, 626, 630, 631, 632, 652

[56] References Cited

U.S. PATENT DOCUMENTS

| | | | |
|---|---|---|---|
| 3,789,971 | 2/1974 | Deyesso et al. | |
| 3,794,902 | 2/1974 | Nishimura et al. | 318/630 |
| 4,225,928 | 9/1980 | Ohkubo | 318/594 X |
| 4,353,019 | 10/1982 | Sweeney, Jr. | 318/594 |
| 4,404,626 | 9/1983 | Aoyama | 318/561 X |
| 4,651,073 | 3/1987 | Shimizu et al. | 318/632 |
| 4,710,865 | 12/1987 | Higomura | 364/170 |
| 4,777,418 | 10/1988 | Furue | 318/603 |
| 4,857,816 | 8/1989 | Rogozinski et al. | 318/632 |
| 4,890,046 | 12/1989 | Kurakake et al. | 318/630 |
| 4,914,366 | 4/1990 | Yuasa et al. | 318/612 |
| 4,950,090 | 8/1990 | Papiernik et al. | 318/815 |
| 5,021,941 | 6/1991 | Ford et al. | 364/176 |
| 5,059,881 | 10/1991 | Fujita et al. | 318/630 |
| 5,095,258 | 3/1992 | Drits et al. | 318/569 |
| 5,159,254 | 10/1992 | Teshima | 318/611 |
| 5,249,118 | 9/1993 | Smith | 364/167.01 |
| 5,442,267 | 8/1995 | Harada | 318/280 |
| 5,442,270 | 8/1995 | Tetsuaki | 318/568.22 |
| 5,710,498 | 1/1998 | Yutkowitz et al. | 318/632 |
| 5,742,140 | 4/1998 | Yamada | 318/568.22 |

Primary Examiner—Bentsu Ro
Attorney, Agent, or Firm—Dinsmore & Shohl LLP

[57] ABSTRACT

A method and apparatus for compensating for the effects of compliant elements in a positioning system is provided. The amount of compensation to be applied can be determined by measuring the lost motion errors which are prevalent during continuous motion of the movable member of the system. The compensation value determined can be used to adjust servo control commands, such as position commands for example. Preferably, the compensation is applied when the movable member is in motion and removed when the movable member comes to a stop. Even more preferably, the compensation is applied and removed gradually. The compensation can be used in additional to friction compensation and backlash compensation, and can be implemented in a machine tool system.

27 Claims, 13 Drawing Sheets

METHOD AND APPARATUS FOR COMPENSATING FOR WINDUP IN A MACHINE

TECHNICAL FIELD

The present invention relates to a method and apparatus for compensating for phenomena which affect the positioning of a movable member in a machine, and, more particularly, in a preferred embodiment, to a method and apparatus for compensating for lost motion due to compliant elements in a machine tool system in which the amount of compensation required is determined by measuring the position error of the movable member of the system while the member is in continuous motion.

BACKGROUND OF THE INVENTION

A movable member (e.g., a sliding table) in machine tool system is generally driven by an actuator, such as a servomotor. However, before any motion is actually imparted to the member by the motor, a number of forces and factors must be overcome. For example, a coulomb (sliding) frictional force or torque is associated with the movable member and opposes the torque created by the revolution of the motor. Until the force generated by the motor becomes large enough to overcome this frictional force, no motion of the movable member will be obtained. Accordingly, movement of the motor will not necessarily result in movement of the member due to the coulomb friction. More specifically, if adequate compensation is not provided, the motor is unable to instantaneously respond to the torque discontinuity which occurs during reversal of the direction of travel due to the step change in the Coulomb friction force (i.e., the reversal of the direction of the force). While the motor will eventually "catch up" and reach the correct position, there is a brief period of time wherein the motor is not in the correct position.

Another example of the factors affecting machine performance is the machine characteristic known as "backlash" which is generally identified by the minuscule spaces between various parts or elements of the machine. Backlash errors are most easily observed when the machine reverses direction, because, during reversal, the machine elements move through these small spaces and are not in complete contact. Accordingly, no motion of the movable member is obtained, although motion is expected because the actuator has moved a particular distance. Thus, backlash can cause "lost motion." Lost motion, as used herein, refers to movement of the actuator which does not produce any movement of the controlled element. If uncompensated, lost motion results in a difference between the desired position of the movable member (also referred to herein as the "axis") and the actual position which is achieved.

As can be understood, these phenomena can cause errors in the performance of the machine, as well as undesirable results, such as poorly machined parts. Accordingly, to prevent such errors, compensation or correction methods have been developed in which a compensation or feedforward value is added (at appropriate times) to the position command or torque command delivered to the motor by the control. A method for compensating for the sudden changes in frictional forces, such as those which occur at axis reversal, is described in U.S. Pat. No. 5,170,498, the entire disclosure of which is hereby incorporated herein by reference. A method for backlash compensation is described in U.S. Pat. No. 3,794,902.

Another method for compensating for various factors affecting performance is known as bidirectional error compensation, which compensates for backlash as well as the error due to variation in the pitch of the ballscrew. In developing the proper levels of compensation, the member is moved incremental amounts, and the difference between the commanded position and the actual position is measured for each increment, such as by using a laser measurement system, after the member has stopped. These errors are clue to backlash as well as to variations in the pitch of the ballscrew. The rated ballscrew pitch is the measure of the expected linear movement per revolution. However, clue to imperfections in the manufacture of the ballscrew, the actual pitch may vary from the rated pitch, and this variation contributes to the error detected by the laser. The amount of error which is measured at each increment can be stored and used as a compensation value to be added to the position command whenever the machine is commanded to move to that particular location. The errors and incremental positions can be stored in a data table, known as a bi-directional error compensation table.

However, while friction compensation, backlash compensation, and bi-directional compensation methods can improve the performance of the machine, it has been found that these compensations do not completely account for all lost motion. In particular, it has been found that these compensation methods do not correct lost motion errors which exist only when the axis is in motion. It is believed that this remaining lost motion is due to a phenomena which we will refer to herein as "windup." "Windup", as used herein, refers to the compression, stretching, compliance or deflection which occurs in various machine components which connect the actuator with the movable member, such as the bearings, couplings, ball screws, and the like. For example, if the actuator attempted to push the movable member to the desired position from a resting position, these components would typically first compress a particular amount before any motion is realized. This compression results in lost motion and the errors that are associated therewith. While known compensation techniques may compensate for the type of lost motion which remains when motion has fully stopped (i.e. persistent lost motion) and which may be partially caused by windup, the type of lost motion which is present only during motion and which slowly corrects itself upon stopping remains uncompensated, and, accordingly, causes errors during motion of the axis.

Accordingly, there is a need for a method and apparatus for effectively compensating for lost motion and errors which are experienced during continuous motion of a positioning system, such as a machine tool system, and which are believed to be due to "windup."

SUMMARY OF THE INVENTION

It is an object of the present invention to obviate the above-described problems.

It is another object of the present invention to provide a method and apparatus for compensating for the effects of windup in a positioning system, such as a machine tool system.

Another object of the present invention is to provide a method and apparatus for compensating for lost motion errors which are encountered during continuous movement of a movable member by a positioning system.

Yet another object of the present invention is to provide a method and apparatus for reducing errors encountered when using the rotary position of a motor to estimate the actual position of a movable member which is positioned by the motor.

Another object of the invention is to provide a method and apparatus for compensating for windup in a machine wherein the compensation is applied only when needed and thereby does not overcompensate when compensation is not needed.

It is another object of the present invention to provide a method and apparatus for compensating for windup in a machine wherein the application of the compensation does not introduce undesirable excitation or vibration into the machine.

Yet another object of the present invention is to provide a method and apparatus for compensating for windup which can effectively determine when application of the compensation is appropriate.

To achieve the foregoing and other objects, and in accordance with the purposes of the present invention as described above, a method of compensating for lost motion in a machine having a movable member controlled by an actuator is provided. The method comprises the steps of producing a position command which is representative of the desired position of the movable member, and moving the movable member in response to the position command. In addition, the method comprises the step of determining a windup error value associated with the machine by measuring a variation between the desired position and the actual position of the movable member that occurs when the movable member is in motion. Also, the method comprises providing actuator commands for control of the actuator movement, and, when the movable member is in motion, adding a windup compensation amount to the actuator commands to adjust the control of the actuator movement. The windup compensation amount is based upon the windup error value determined.

According to the present invention, an apparatus for compensating for lost motion errors in a machine having a movable member controlled by an actuator is also provided. The apparatus comprises a position command generator situated in communication with the actuator to apply position commands to the actuator. The apparatus also comprises a movable member motion detector, and a windup compensator arranged in communication with the position command generator and the motion detector. The windup compensator is adapted to adjust the position commands based upon a predetermined windup value when the movable member is in motion. The predetermined windup value is based upon positioning error measured while the member was in motion.

Still other aspects of the present invention will become apparent to those skilled in this art from the following description wherein there is shown and described preferred embodiments of this invention, simply by way of illustration, as well as a best mode contemplated for carrying out the invention. As will be realized, the invention is capable of other different aspects and embodiments without departing from the scope of the invention. Accordingly, the drawings and descriptions should be regarded as illustrated in nature and not as restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF THE PREFERRED EMBODIMENTS

I. Windup

Figure 1:
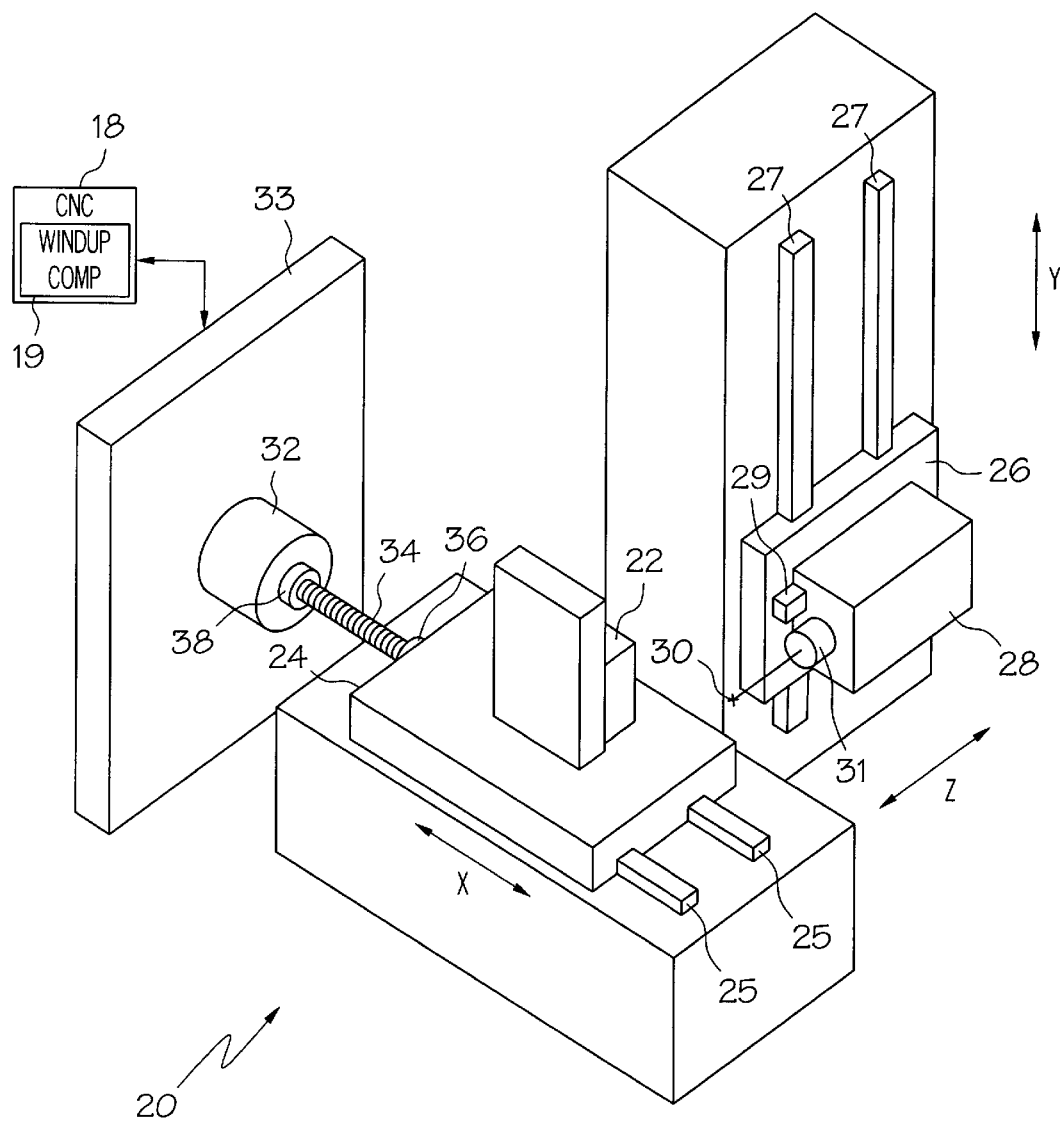
FIG. 1 is a schematic view illustrating a machine tool having moveable members to be positioned in the course of producing a finished workpiece, and including a windup compensator according to the present invention.

Referring now to the drawings in detail, wherein like numerals indicate the same elements throughout the views, FIG. 1 illustrates one possible application of the windup compensation apparatus and method of the present invention. In this particular application of the invention, the windup compensator 19 is part of a computer numerical control (CNC) 18 which is used to control a machine tool 20 for machining a workpiece (or part) 22. Three movable members 24, 26, and 28 are provided for properly positioning the workpiece 22 relative to the workpoint 30 (at which the tool point or surface will be located). Each of these three movable members 24, 26, and 28 is slidingly movable about a respective linear axis, such as the X, Y, and Z axes shown, along guideways 25, 27, and 29 respectively. The positions of these members can be controlled by the CNC 18 such that the workpoint 30 is caused to move along a path in the course of performing work on the workpiece 22. Linear paths are typically defined by path end points represented by sets of coordinates of the X, Y, and Z axes, while circular paths are defined by a combination of path end points and circle center data.

As discussed in further detail below with respect to FIG. 11, the machine tool 20 is controlled by a cycle control in the CNC 18 which transfers workpiece program instructions to a block processor, and which decodes the instructions into data and distributes the data to other processors in the machine for control of the machine. The workpiece program instructions include blocks of instructions for defining member position coordinates, feed rates, spindle speeds and the like. Some of the decoded data produced by the block processor is distributed to a path generation processor that generates coordinate axis position commands for each of the machine members 24, 26, and 28 oriented in the X, Y, and Z axis at predetermined machine position update intervals. These coordinate axis position commands are then transferred to a servomechanism controller which provides closed loop control of an actuator, such as a motor for example, for each of the movable members.

The closed loop control of the movable member actuators includes current signals provided to the actuators which are generated by power switches in a power block. The power switches are operated by control signals from the servomechanism controller. The current signals fed to the machine member actuators cause the movable member (24, 26, or 28) to move on its respective axis to a position and at a rate corresponding to the control signals from the servomechanism controller.

In the embodiment depicted in FIG. 1, the actuator for the movable member 24 comprises a motor 32 which is mounted on a stationary member 33. A ballscrew 34 can be connected to the movable member 24, such as by a ball screw nut 36 attached to the member. The ballscrew 34 can be connected to the motor 32 such as by a coupling 38 or the like. Accordingly, the motor 32 can selectively impart linear motion to the member 24 along the X axis. Similar configurations can be used to drive the members 26 and 28 in the Y and Z axes respectively.

As discussed above, it has been found that rotation of an actuator 32 in arrangements known heretofore will not necessarily produce the expected linear movement of the movable member. It is believed that part of this lost motion is due to compliant elements in the machine, and pure backlash, as discussed above. However, it has been found that, even with known compensation techniques, some lost motion and resulting errors remain.

Not wishing to be bound by any particular theory, Applicant believes that this remaining lost motion is due to the mechanical spring-like compliance of the parts connecting the actuator and the movable member (e.g. the ballscrew 34, ballscrew nut 36, and coupling 38). For example, if the motor 32 were to begin rotating from a stopped state, the member 24 might not necessarily begin moving linearly as the compliant parts begin to tighten and/or compress and the system begins to "windup." Once the windup is complete, then movement may begin. Thus, the system experiences "lost motion" which creates a difference in the commanded position of the member 24, and the actual position of the member.

Similarly, if the motor 32 were to reverse from a positive rotational direction to a negative rotational direction, the compliant parts must "unwind" and then windup again in the opposite direction before the motor begins to apply a force in the opposite direction to the member 24. Again, lost motion and potential errors result.

It is believed that some portion of the lost motion due to windup occurs only during continuous motion of the machine, because the compliant elements "unwind" when the machine comes to a stop. This is the reason, it is believed, that known compensation techniques do not reduce all windup errors. Friction compensation applications conventionally only apply a compensating value during axis reversals to overcome the torque discontinuity, and this value is later removed. Thus, friction compensation is not applied according to whether the axis is in continuous motion.

Likewise, backlash errors are present regardless of whether the axis is in motion, and backlash compensation is typically applied at axis reversal to account for the small spaces between the contacting machine elements. Accordingly, this compensation accounts for "persistent" or "static" lost motion errors, and not for the lost motion error that exists only when the axis is in motion. As used herein, "persistent" or "static" lost motion error refers to lost motion error which substantially remains even when the movable member stops. For example, when backlash is present, the movable member will never achieve the desired position, even after coming to a stop, unless the backlash is compensated. When the type of windup is present which "unwinds" when the axis comes to a full stop, however, the movable member will typically substantially achieve the desired position when stopped, due to the compliant elements unwinding. However, when the movable member is in motion, the wound up elements cause lost motion due to this type of windup error, an error which present compensation techniques do not correct.

II. Windup Compensation

Thus, the present invention includes a windup compensator 19 as part of the CNC 18 to compensate for the lost motion experienced when the axis is in motion and which is believed to be caused by the phenomena of "windup." As described in further detail below, this compensator 19 preferably adds a compensation amount to the position command produced by the CNC 18 in order to overcome the non-persistent lost motion due to the spring-like compliance of the machine parts. This compensation is preferably only added during motion and removed when motion has stopped, as described further below.

A. Windup Model

Figure 2:
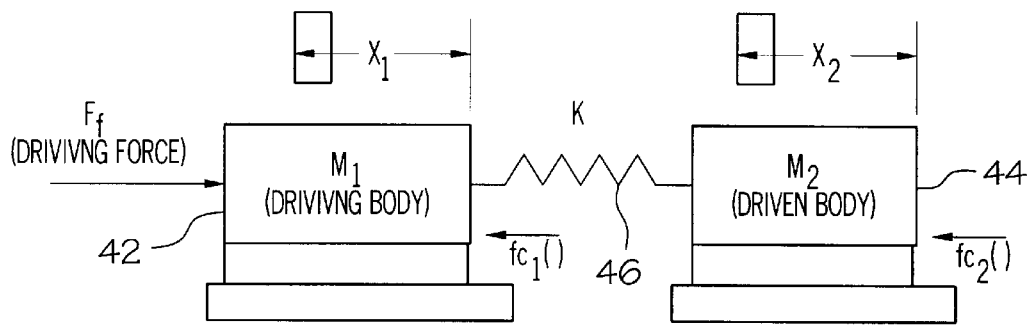
FIG. 2 is an schematic of an exemplary model illustrating the effects of windup in a positioning system.

As shown in FIG. 2, the windup compensation method and apparatus of the present invention can be based on a model of a drive train as a two body system where a driving body 42, having a mass $M_1$, drives a driven body 44, having a mass $M_2$, through a compliant element 46, having a spring constant K. Each body is exposed to frictional forces which are idealized as Coulomb friction. Although the actual location of the compliant element 46 and the frictional force are distributed over the entire mechanical system, the two body model has been found to work reasonably well for machine tool applications and the like. When applied to the machine tool system of FIG. 1, for example, the driving body 42 would correspond with the motor 32, the driven body would correspond with the movable member (or "table") 24, and the compliant element 46 would correspond with the elements coupling the motor and the movable member, such as the coupling 38, ballscrew 34, and ballscrew nut 36. The model of FIG. 2 would also apply to each of the movable members 26 and 28 and the actuators and couplings associated therewith.

Figure 3:
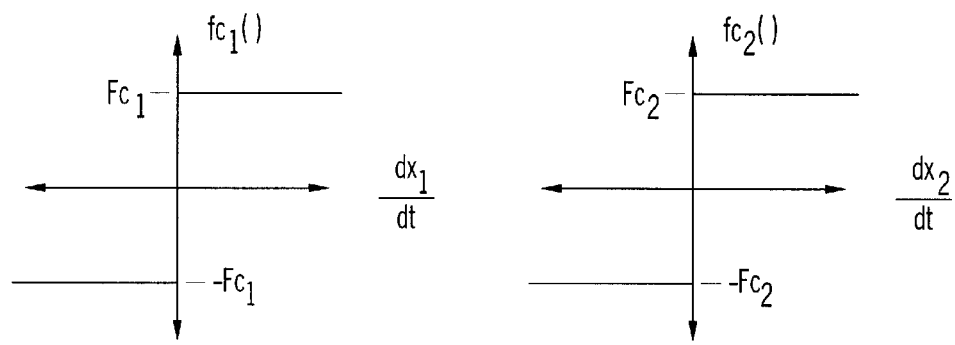
FIG. 3 is a graph illustrating the behavior of the friction forces in the model of FIG. 2 with respect to velocity.

In FIG. 2, $fc_1$ and $fc_2$ represent the Coulomb friction forces which are functions of velocity. These are typically non-linear functions in which a constant force opposes the direction of motion. The general characteristic behavior of these functions is shown graphically in FIG. 3, where $Fc_1$ and $Fc_2$ represent the amplitude of the Coulomb friction forces acting on each of the two masses.

Turning again to the exemplary model of FIG. 2, the lost motion error (E) due to windup will be equal to $X_1$ minus $X_2$, because the actual position (i.e., the position of the driven body 44) is equal to $X_2$ and the desired or commanded position (e.g., the position of the driving body 42) is equal to $X_1$. In other words:

$$E = X_1 - X_2$$

It is known that $X_2$ is a function of the position $X_1$ of the driving body 42 ($M_1$), the velocity of the driven body ($dX_2/dt$), and the acceleration of the driven body ($d^2 X_2/dt^2$). More particularly, $X_2$ can be represented by the following equation:

$$X_2 = X_1 - (1/K)*(M_2*(d^2X_2/dt^2) + B_2*(dX_2/dt) + Fc_2*sgn(dX_2/dt))$$

where $B_2$ is a coefficient of viscous friction.

It has been found that, for low acceleration, the mass $M_2$ can be assumed negligible, and that the term relating to viscous friction $B_2$ is insignificant relative to coulomb friction (i.e., can be ignored). Thus, in terms of $X_1$, the equation can be formulated as:

$$X_1 = X_2 + 1/K*Fc_2*sgn(dX_2/dt)$$

Upon substituting this equation into the equation for windup error (E), the approximation for windup becomes $$E = 1/K*Fc_2*sgn(dX_2/dt))$$

It has also been found that the term $1/K*Fc_2$ can be approximated by measuring the total amount of lost motion error which occurs at axis reversals which involve continuous motion, such as by using a ball bar plot. This lost motion is referred to as the total windup W. However, it is only one-half of this term which is of interest because, at axis reversal, it is believed that half of the lost motion is due to the machine unwinding from the first direction and the other half is due to the machine winding back up to transition to the second direction.

Moreover, it has been found that the velocity ($dX_2/dt$) can be approximated by an estimator which models the closed position loop dynamics as a linear first order low-pass filter. This approximation is referred to herein as the velocity estimate $v_{est}$. Accordingly, the equation becomes $$E = W/2*sgn(v_{est})$$

Various methods and devices that can be used to determine the total windup W as well as the velocity estimate $v_{est}$ are described in further detail below.

B. The Windup Parameter W

Figure 4A:
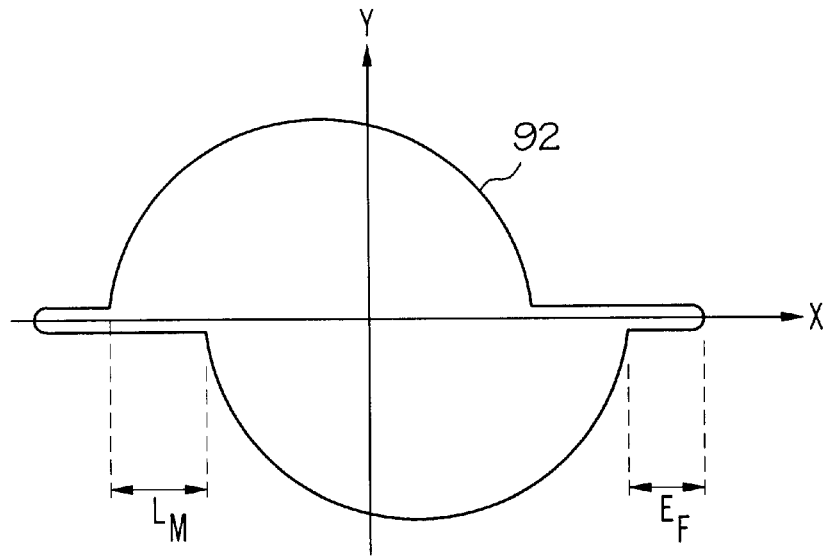
FIG. 4a is an exemplary ballbar plot illustrating the lost motion and transient errors which occur when no compensation has been applied.
Figure 4B:
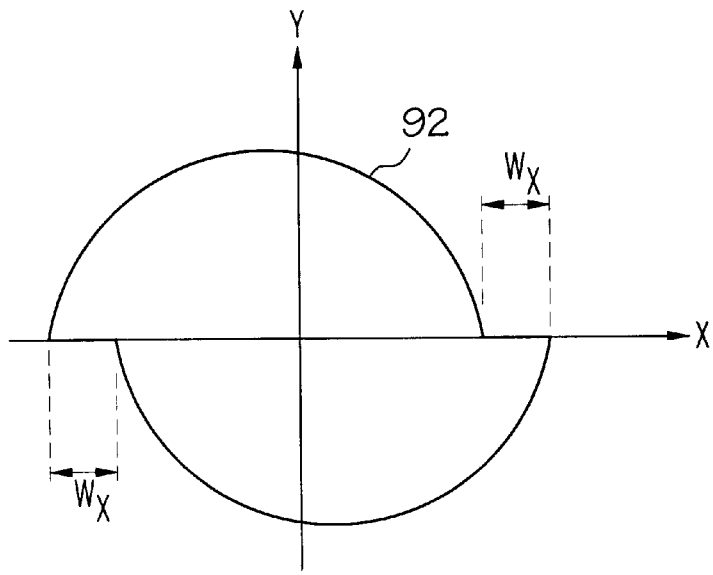
FIG. 4b is an exemplary ballbar plot illustrating the lost motion errors which remain when friction compensation and bi-directional error compensation have been applied, and which are believed to be due to windup in the machine.

The total amount of windup W can be determined by testing the machine tool, such as through the use of a ballbar test. A telescoping ballbar is a sensing device consisting of a carbon fibre bar and two precision balls—one located at each end. One of the balls magnetically attaches to a centering cup that is mounted in the machine spindle (element 31 of FIG. 1), while the second rides inside a magnetic center mount secured to the machine table (element 24 of FIG. 1). The machine is moved through a multi-axis inspection routine, and deviations from a geometric ideal, such as an ideal circle for example, are measured by a linear transducer contained within the telescoping bar. The device measures contouring accuracy by continuously reading the output of the transducer, as the machine moves in a circle in either the X-Y, Y-Z, or X-Z planes. As shown in FIG. 4a and FIG. 4b, the polar error plot 92 of the machine tool motion is graphed, such as by a personal computer serially linked to the ballbar, and any deviation from the ideal circle can be output to the computer. An exemplary ballbar system is the Renishaw QC10 ballbar system, available from Renishaw Inc. of Schaumburg, Ill.

More specifically FIG. 4a shows an exemplary ballbar plot (i.e., polar error plot or roundness gauge plot) for a machine tool system wherein no friction compensation, backlash compensation, or windup compensation have been applied. (In this idealized graph, the normal torque ripples and noise have been ignored or averaged.) The coulomb friction transient error which is caused by torque discontinuity at axis reversal is manifested by outward pointing spikes which occur at the quadrant boundaries. This error is labeled as $E_f$ in FIG. 4a. Typically, this transient error will occur at reversals of all axes being considered, but, for clarity, errors are only shown with respect to the X axis in FIG. 4a and FIG. 4b.

In addition to the transient error at axis reversal, lost motion error is also illustrated in FIG. 4a. The lost motion error due to backlash and windup are usually indistinguishable on a ballbar plot. This error is labeled as LM in FIG. 4a.

To minimize the coulomb friction error $E_f$ and lost motion LM, compensation methods and devices can be utilized. As noted above, friction compensation can be applied, for example, by using the method and apparatus described in U.S. Pat. No. 5,710,498, discussed above. Backlash compensation can be applied, for example, by the techniques disclosed in U.S. Pat. No. 3,794,902.

However, despite these compensations, some lost motion is still evident during continuous motion, as shown by the exemplary ballbar plot of FIG. 4b. It is believed that this lost motion is due to windup, and it is labeled as $W_x$ on FIG. 4b. It is also believed that this is the type of lost motion which decays to approximately zero when the movable member comes to a stop. On a ballbar plot, a signature of this type of windup is the remaining lost motion when friction compensation and backlash compensation have been applied. As described in further detail below with respect to FIG. 10, the ballbar plot can be used to determine the amount of compensation to apply to counteract this remaining lost motion.

C. Selective Application of Windup Compensation

It has been found that compensating for this additional non-persistent lost motion (i.e., in-motion error) is not optimally accomplished by merely adding an appropriate compensation or feedforward amount to the position command. Rather, applicant has discovered that the windup compensation is preferably provided during continuous motion of the movable member and removed when the movable member has come to a rest. As discussed above, it is believed that compensation should not be applied once the movable member has come to a rest because the compliant elements in the system unwind and thereby force the movable member somewhat further. Accordingly, if the windup compensation was not "undone" or removed by the time the system stopped, the movable member would overshoot the expected position, which is defined by the uncompensated position command. However, during continuous motion of the movable member, the elements remain "wound up" and the compensation should be added to the position command to get the actual position to more closely equal the desired position.

i. State Model

Figure 5A:
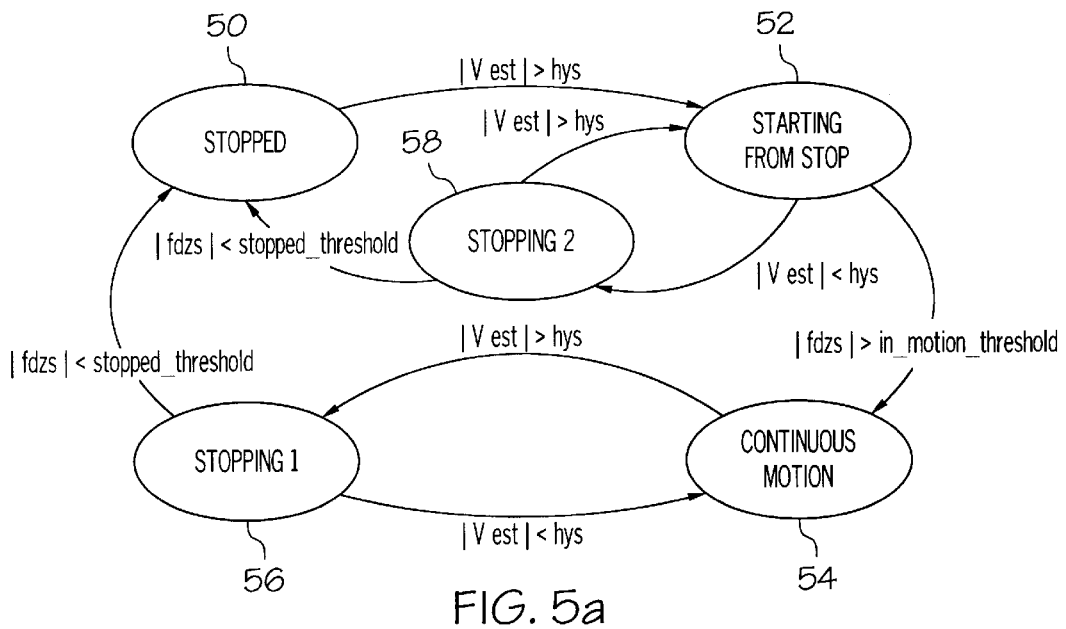
FIG. 5a is a block diagram illustrating a method of the present invention for determining the state of the machine, the state determining the amount of windup compensation to be applied.

One way to apply the windup compensation only during continuous motion and to remove the compensation during stopped states is to use a state machine to estimate the state of the system. FIG. 5a is a state diagram illustrating an exemplary manner in which a state machine could determine the state of the system, such as whether the system is starting from a stop, in continuous motion, stopping, or stopped. Such a machine can be implemented by programming the CNC to analyze the velocity of the movable member, and to determine the next state of the machine based upon this velocity and the previously determined state.

a. Velocity Estimate

To implement such a state machine, velocity could be measured directly by appropriate measuring devices, such as encoders, transducers, or other sensors. However, using feedback measurements to drive the windup compensator can create a non-linear feedback control system which could enter into a limit cycle.

Thus, one alternative would be to estimate velocity based upon position command changes or velocity commands. However, it is known that the commanded position and velocity are not realized instantaneously. Accordingly, actual velocity and commanded velocity will generally differ, and the actual velocity typically reflects a velocity which was commanded at some previous time. For example, an axis reversal will usually occur at some time later than when the reversal is commanded, as reflected in the position command.

Thus, it is preferred that the state of the system be determined by an estimate of velocity. In the preferred embodiment, a sampled data system (i.e., discrete time system) is used in which the position commands and feedforward commands fed to the actuators are updated at predetermined intervals. In such an embodiment, it is known that an adequate velocity estimate can be derived by using digital filter function (e.g., a difference equation) which operates on current and previous position commands, and current and previous velocity feedforward commands. For example, the following equation could be used to estimate the velocity:

$$VEST_k = d_o * VEST_{k-1} + (1-d_o) * (PCMD_k - PCMD_{k-1}) + (VFF_k - VFF_{k-1})$$

Where:

$VEST_k$ is the estimate of the velocity for the $k^{th}$ update interval $d_o$ is a selectable value for the discrete time pole of the filter transfer function $PCMD_k$ is the commanded position for the $k^{th}$ update (i.e., the current update)

$PCMD_{k-1}$ is the commanded position for the k-1 update (i.e., the previous update)

$VFF_k$ is the velocity feedforward command for the $k^{th}$ update $VFF_{k-1}$ is the velocity feedforward command for the k-1 update If velocity feedforward commands are not used, then the last term of the equation can be omitted ($VFF_k - VFF_{k-1}$).

The value of the discrete velocity estimator filter pole, $d_o$, can be set based upon an estimate of how the position loop responds to inputs and to duplicate the approximate first order response of the position loop. Thus, this parameter affects the point in time at which the windup compensation is applied. The value of the discrete time pole $d_o$ can be based upon an equation relating to the continuous time velocity estimator pole VEP. A preferred value for the pole VEP has been found to be as follows:

$$VEP = 1000 * K_v / 60$$

where $K_v$ is the position loop gain in units of inverse thousandths of minutes (described further below)

Based upon this value for the continuous time filter pole VEP, the value for the discrete time filter pole can be calculated according to the equation:

$$d_o = 1 - VEP * T$$

where T is the update interval time of the position commands (e.g., 3 milliseconds, 5 milliseconds).

While it is preferred that a velocity estimate be utilized in the manner described above, it should be understood that other methods of estimating velocity can be utilized without departing from the scope of the invention. For example, if an acceleration feedforward command is utilized, this command could be included in the velocity estimate calculation. In addition, it should be understood that, rather than using a velocity estimate, an actual velocity measurement can be taken, without departing from the present invention.

As is shown in the exemplary state diagram of FIG. 5a, the velocity estimate taken can be used to determine the state of the machine. Then, the state of the machine can be used to determine how windup compensation should be applied or removed. In the example of FIG. 5a, the machine is either in a stopped state 50, a starting from stopped state 52, a continuous motion state 54, or one of two stopping states (56 or 58). Based upon the state determined, the amount of windup compensation to be applied is calculated, as well as the amount of other compensations if other compensations are utilized. For application of these compensations, it may be desirable to distinguish between stopping after starting and stopping after continuous motion. However, it should be understood that windup compensation can be implemented using the state diagram of FIG. 5b, wherein only one stopping state is provided.

Figure 5B:
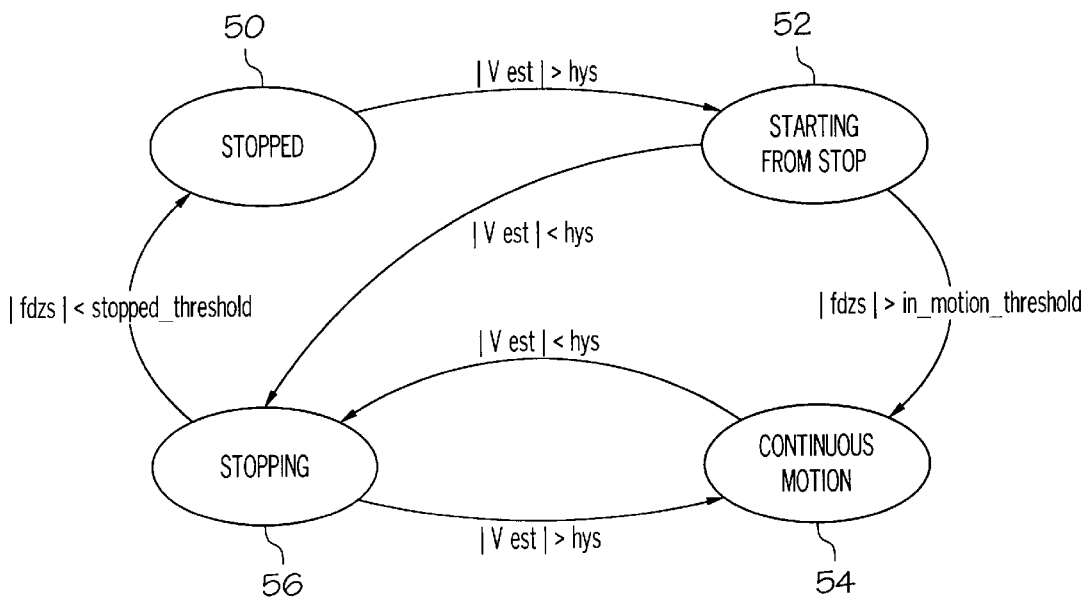
FIG. 5b is a block diagram illustrating an alternative method of the present invention for determining the state of the machine.

It should also be understood, however, that fewer or more states can be utilized in the machine than are described in FIG. 5a and 5b, without departing from the scope of the invention.

As shown in both FIG. 5a and FIG. 5b, the velocity estimate and the current state of the machine can be used to determine the next state of the machine. For example, and as shown in FIG. 5b, the absolute value of the velocity estimate, calculated as described above, can be compared to a predetermined nominal threshold or hysteresis value (hys) in order to determine the next state. The hysteresis value is preferably a relatively small value which is chosen to represent when the machine is fairly near to stopping (i.e., close to completing its stopping procedures). The optimum value of the hysteresis velocity can be found by trial and error. A number that is large will result in a stopped state being detected more often, while a number that is smaller will result in a continuous motion state being detected more often. Because the state detected will affect the amount of compensation applied, the value of hysteresis will affect performance. However, a value of around 15 microns per second has been found to work reasonably well for machine tools having a smallest detectable distance of 0.02 microns and an update interval of either 1.5, 3.0, or 4.0 milliseconds.

With reference to the state diagram of FIG. 5b, when the absolute value of the estimated velocity of the movable member moves from below the hysteresis value to above this value, the machine was previously either stopped 50 or stopping 56, and is now either starting from a top 52 or heading into continuous motion 54. Conversely, in this example, whenever the absolute value of the estimated velocity rises from below the hysteresis value to above the hysteresis value, the machine was either starting from a stop 52 or in continuous motion 54, and is now stopping 56.

b. The dzs and fdzs Functions

Figure 6A:
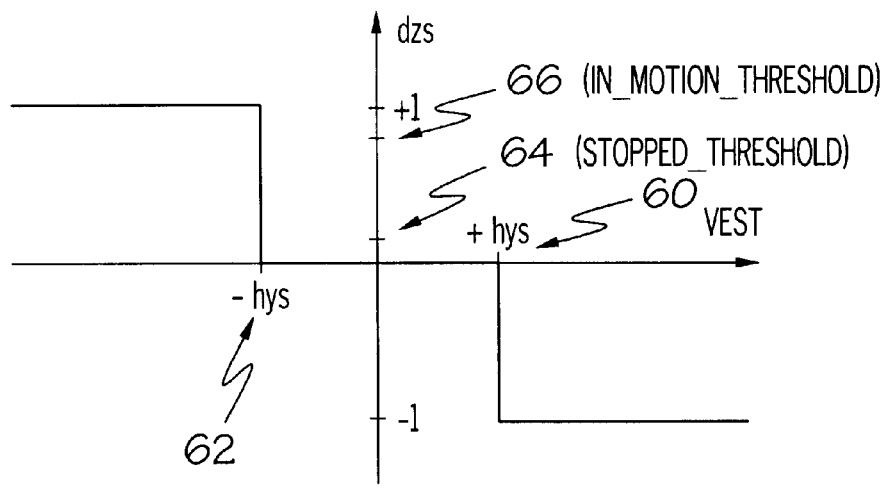
FIG. 6a is a graph illustrating the behavior of an exemplary dead zone saturation function with respect to estimated velocity.

To provide the various states of FIG. 5a and FIG. 5b, a function in addition to the velocity estimate can be utilized. This function is referred to herein as the "dead zone saturation" function, or dzs function. As shown in FIG. 6a, the dzs function is based upon estimated velocity and is equal to +1 when the estimated velocity is less than the opposite (negative) of the hysteresis value (−hys 62), −1 when the estimated velocity is greater than the positive hysteresis value (+hys 60), and 0 at all velocity values in between (i.e., the "dead zone").

This function can then be filtered according to a first order digital low pass filter, by a function which is referred to herein as the "filtered dead zone saturation" function (or fdzs), according to the following difference equation:

$$fdzs(k)=sfp*fdzs(k-1)+0.5(dzs(k)+dzs(k-1))$$

where sfp is a selectable time smoothing filter pole fdzs(k−1) is the value of the filtered dead zone saturation function during the previous update interval (a value between −1 and +1)

dzs(k) is the value of the dead zone saturation function during the current update interval (1, −1, or 0)

dzs(k−1) is the value of the dead zone saturation function during the previous update interval (1, −1, or 0)

Figure 6B:
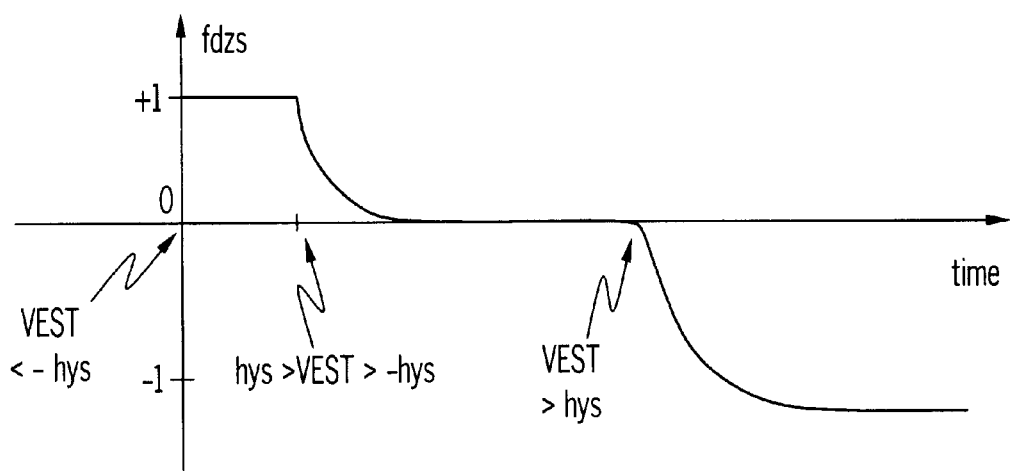
FIG. 6b is a graph illustrating the behavior of a filtered dead zone saturation function with respect to time.

The purpose of both the dzs and the fdzs functions is to provide a means for determining when the axis transitions from starting to continuous motion and when it transitions from stopped to stopping, as shown in FIG. 5a and FIG. 5b. The rationale for using the dzs and fdzs functions is that the velocity estimate often passes through the dead-zone, defined by −hys 62 and +hys 60 of FIG. 6, while in continuous motion. Thus, a strict comparison of the velocity to only the −hys and +hys values might erroneously register a "stopped" state, while the axis is really in continuous motion. However, while the dzs function makes a transition, such as from 1 to 0 or from 0 to −1, instantaneously in a step manner, the fdzs provides a time constant such that the transition is made in a decaying manner rather than instantaneously. Accordingly, the fdzs function transitions gradually from −1 or +1 to zero as the velocity is within the dead-zone, and thereby introduces a time constant into the state machine. This behavior is illustrated in FIG. 6b. This time constant is determined by the value of the smoothing filter pole sfp described above. It is preferred that the discrete time smoothing filter pole, sfp, is chosen to be half of the velocity estimator pole, $d_o$, discussed above with respect to the velocity estimator equation.

Thus, by comparing the value of the fdzs function to a threshold value, such as the stopped_threshold value 64 of FIG. 6, it can be determined with greater accuracy whether the axis is actually "stopped" 50 or whether it is really just reversing during one continuous motion. If the axis is really just reversing, the fdzs will not decay fast enough to reach the stopped_threshold value 64, before the velocity estimate reaches the hysteresis value in the opposite direction. Accordingly, with reference to FIG. 5b, the states will transition from continuous motion 54 to stopping 56, and back to continuous motion 54. Conversely, if the axis is really stopping, the fdzs will decay past the stopped_threshold value 64 before the velocity rises above the hysteresis value again. Accordingly, a "stopped" state 50 will be detected, as shown in FIG. 5b.

Likewise, when the velocity estimate is "starting from a stop" 52, it should not be considered to be undergoing "continuous motion" 54 until the velocity estimate consistently exceeds the hysteresis level for a given period of time. This can be accomplished by allowing the state to switch to "continuous motion" 54 only when the absolute value of the fdzs function has exceeded an upper level threshold, shown as in_motion_threshold 66 in FIG. 6. However, if the velocity estimate falls below the hysteresis value prior to the gradual rise of the fdzs function past this in_motion_threshold 66, then the state will transition to stopping 56, rather than to continuous motion 54, as shown in FIG. 5b.

Rather than using the dzs and fdzs functions, the time factor can be introduced into the state machine by using a clock or counter. In this embodiment, the absolute value of the velocity estimate must surpass the hysteresis value for a predetermined period of time before being considered in the continuous motion state. Likewise, the absolute value of the velocity estimate must be less than the hysteresis value for a given period of time before being considered in a stopped state. It is contemplated that the scope of the present invention cover such a counter or timer embodiment.

c. Gradually Applying and Removing the Windup Compensation in the State Model

As noted above, windup compensation is preferably applied by adding a compensation value as an offset to the position command fed to the position command loop. If multiple compensations are used, such as friction force compensation and backlash compensation, the total compensation can be calculated and then this total added to the position command. As also noted above, the value of the compensation can be based upon the amount of lost motion observed during continuous motion, such as by using a ballbar plot.

In the state model example, the amount of windup compensation to be applied depends upon the state of the machine, and the state can be determined by the methods described above with respect to FIG. 5 and FIG. 6. In general, it has been found that the windup compensation should be applied when the axis is in "continuous motion" 54 or "starting from a stop" 52, and removed when the axis is "stopping" (56 or 58) or stopped 50. More specifically, it is believed that when acceleration rates are small such that friction forces dominate inertial forces, the driven body slows to a stop and the windup in the compliant element is maintained because the force provided by the windup does not exceed the friction force. Thus, although the driven body is at the desired location, the compliant element could maintain some potential energy if there is not enough time for the energy to "creep" away. If this potential energy is not removed, it could be present during future movements and it could result in additional motion causing the driven body to "creep" to a position beyond the desired endpoint. As can be understood, removing the windup compensation will remove this built up potential energy without moving the body.

In the other case, when the driven body comes to a stop after a high acceleration, it is believed that the driven body will move some distance further than desired due to momentum rate and compliance present in the system, if the compensation is not removed. In this case, the driven body must be moved back to the desired position by removing the windup compensation. Thus, it has been found that the windup compensation is preferably removed when stopping However, while the present invention contemplates removing the windup compensation when the movable member has stopped, it has also been found that removing the compensation abruptly is not desirable. A step change in windup compensation results in a step change in the command to which it is added. Such abrupt changes in the command can introduce excitation, noise, modes of vibration, and/or other undesirable effects into the system. Accordingly, it is most preferred that windup compensation is added and removed gradually to prevent such undesirable effects.

One way of providing this gradual transition of the windup compensation is to utilize the state model described above, and, based upon the state detected, apply or remove the windup gradually. For example, if it is determined that the machine is in the stopped or stopping states (states 50 and 56/58 of the state diagram of FIG. 5a), the windup compensation can be removed gradually by letting it decay with a time constant. This time constant can be the same as the smoothing filter pole (sfp) used for the fdzs function described above. In this scenario, the windup compensation (wcmp$_k$) is calculated according to the following equation:

$$wcmp_k = sfp * wcmp_{k-1}$$

Thus, because the smoothing filter pole sfp is less than 1, the compensation is equal to some percentage of the previous compensation value (wcmp$_{k-1}$), thereby allowing the compensation to decay gradually over time, rather than abruptly.

In the other two states depicted in FIG. 5a, "starting from stop" 52 and "continuous motion" 54, it is preferred that the windup compensation is applied. However, due to the adverse affects of step changes, it is preferred that the windup compensation is applied gradually until it reaches a maximum value. This maximum value is preferably defined by the amount of lost motion due to the windup measured at a continuous motion axis reversal (W) divided by two.

In implementing the gradual application of windup compensation, it has been found that the amount of windup compensation is preferably applied such that it does not exceed the distance traveled by the axis since the last full stop. This prevents the application of too much windup compensation for very small moves, such as those which occur under handwheel control and incremental jog. It also ensures that the windup compensation is applied gradually for axis reversals which involve very low acceleration rates. Because the velocity estimate (VEST$_k$) is representative of the distance traveled during the most recent update, it can be added to the windup compensation of the previous update until the maximum level (W/2) is reached to ensure that the windup is applied gradually. Thus, the following equations can be used to gradually apply the windup compensation to the full throttle value of W/2:

$$wcmp_k = wcmp_{k-1} + VEST_k \text{ when: } sgn(VEST_k) * wcmp_k < W/2$$

$$wcmp_k = sgn(VEST_k) * W/2 \text{ when: } sgn(VEST_k) * wcmp_k \geq W/2$$

In practice, the windup compensation can be calculated using the first of these equations. Then, the result of the calculation can be multiplied by the sign of the velocity estimate and the product compared to W/2. If the product is less than W/2, then the calculation is used as the windup compensation. However, if the product is greater than or equal to W/2, then the windup compensation is clamped at the maximum value of W/2, by utilizing the second of these equations.

It should be noted, however, that these equations can result in a step change in the amount of windup compensation during axis reversals that involve high accelerations. In other words, if the estimated velocity (VEST$_k$) changes very quickly from a sufficiently large positive value to a sufficiently large negative value, or vice versa, the windup compensation may instantaneously shift from W/2 to −W/2. However, a step change in this instance would be desirable because of the quickness of the reversal, in order to ensure the windup compensation efficiently tracks the rapid change in compliance (e.g., from fully stretched elements to fully compressed elements).

However, in situations of axis reversal where the acceleration rate is low, the two equations described above cause the compensation to be removed gradually and then applied gradually in the opposite direction. It is in these situations that step changes should be particularly avoided because of the undesirable noise and excitation they can introduce to the slowly accelerating system. Thus, the equations allow the rate of application of the windup compensation to be in proportion to the rate of acceleration of the axis at the time of reversal.

Figure 7A:
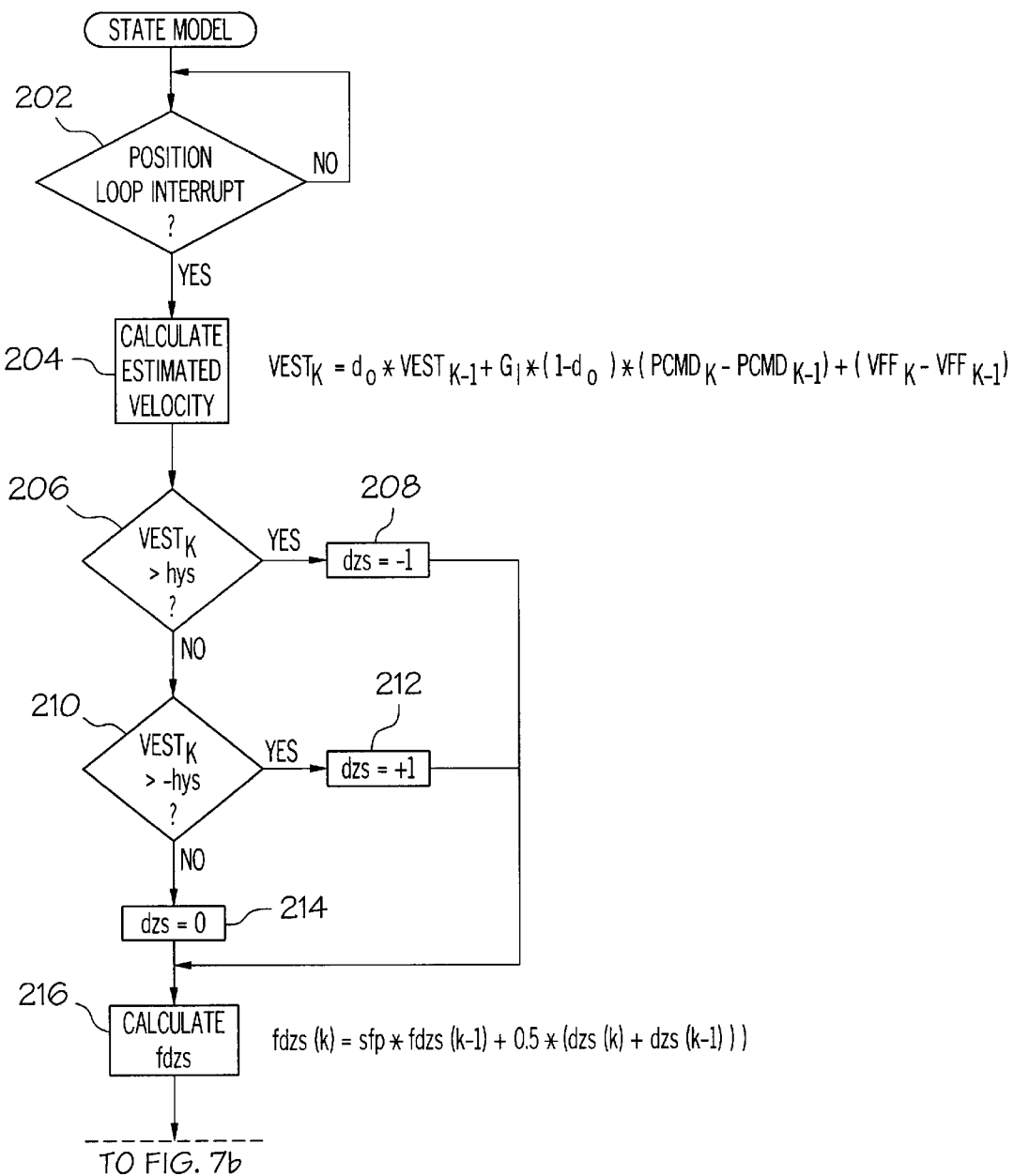
FIGS. 7a and 7b are a flow diagram illustrating a state model implementation of windup compensation, according to one exemplary embodiment of the present invention.
Figure 7B:
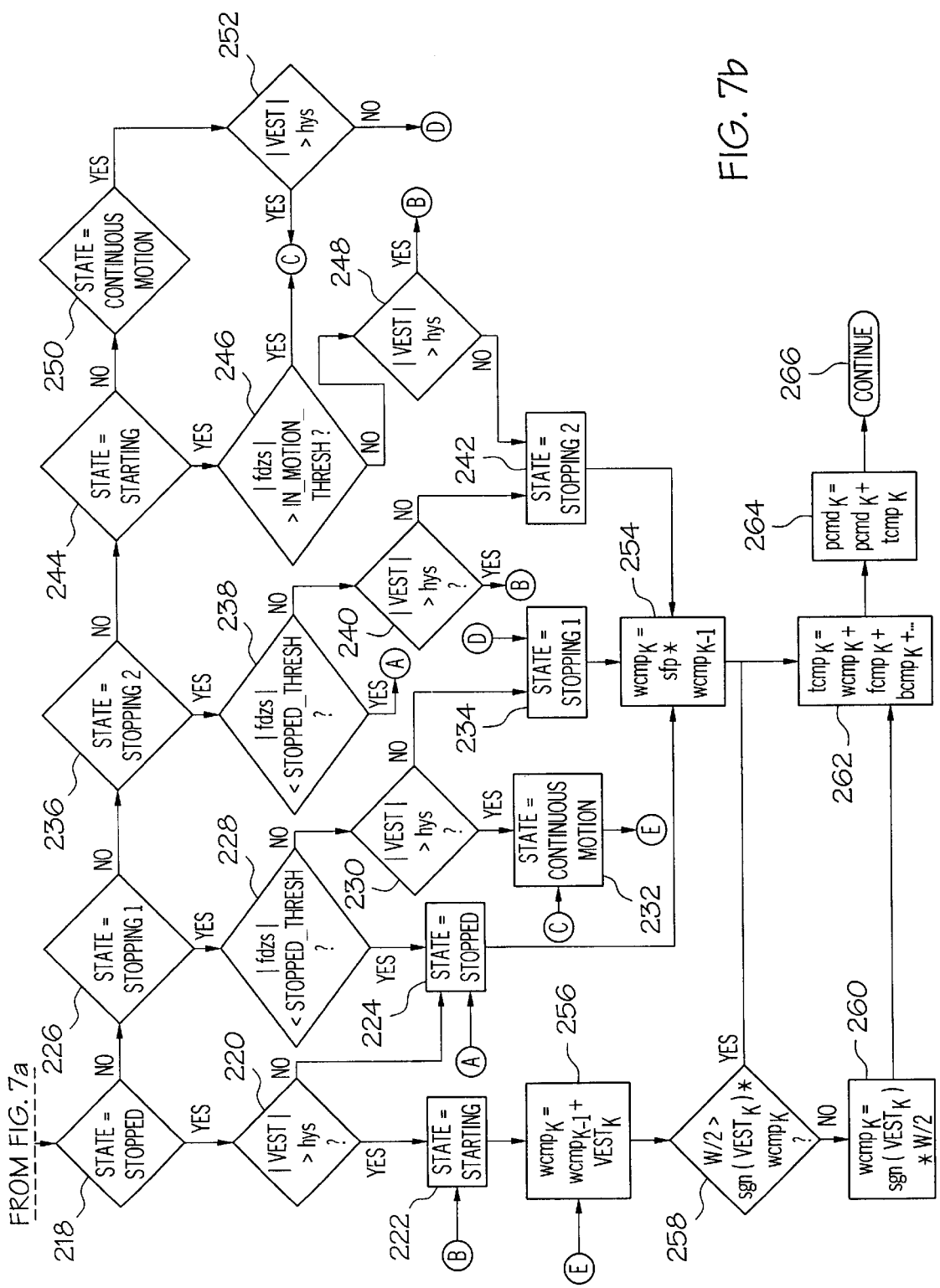

The flow diagram of FIG. 7a and FIG. 7b illustrates the preferred operation of the state model embodiment of the windup compensation method and apparatus described above. According to this example, at decision step 202, a position loop interrupt is detected marking the start of a new position update interval. This interrupt indicates that new position commands have been generated for the axis. Then, at process step 204, a value of estimated velocity is calculated, such as by using the following equation which is described in detail above:

$$VEST_k = d_o * VEST_{k-1} + G_1 * (1-d_o) * (PCMD_k - PCMD_{k-1}) + (VFF_k - VFF_{k-1})$$

After the velocity estimate is calculated, the estimate is used to determine the dzs function, the dzs function is used to determine the fdzs function, and the velocity estimate and fdzs function are used to determine the state of the machine. In particular, after step 204, step 206 is executed, wherein the velocity estimate VEST$_k$ is compared to the hysteresis value. If the velocity estimate is greater than the hysteresis value, then the dzs function is set equal to +1. If the velocity estimate is less than the negative of the hysteresis value, as determined at decision step 210, then the dzs function is set equal to −1. Finally, if the velocity estimate is neither greater than or less than the hysteresis value, the dzs function is set equal to 0, at step 214.

Once the dzs function is calculated, the fdzs function value can be determined at step 216, such as according to the following equation as discussed above:

$$fdzs(k) = sfp * fdzs(k-1) + 0.5(dzs(k) + dzs(k-1))$$

Knowing the velocity estimate and the fdzs function value, the next state of the machine can be set. More specifically, at decision steps 218, 226, 236, 244, and 250 it is determined what the state of the machine was previously, by comparing the variable "State" to the five preferred states. At power up or reset, it is preferred that this variable is set to "stopped", as no motion will be expected.

If the state is "stopped", as determined as step 218, then the absolute value of the velocity estimate is compared to the hysteresis value, at step 220. If the absolute value of the velocity estimate is greater than the hysteresis value, then the state should be changed to the "starting from stop" state, such as by setting the variable "State," as shown at step 222. However, if it is determined at step 220 that the velocity estimate is not greater than the hysteresis value, then the state should remain as "stopped", as shown at step 224.

If it is determined, it step 226, that the machine is currently in the "stopping 1" state, then the absolute value of the fdzs function is compared to the stopped_threshold value discussed above. If fdzs is less than the stopped_threshold value, then the state switches from "stopping 1" to "stopped" at step 224. Otherwise, decision block 230 is executed, and if the absolute value of the velocity estimate is greater than the hysteresis value, the state switches to the "continuous motion" state, as shown at block 232. If the absolute value of the velocity estimate is not greater than the hysteresis value, then block 234 is executed and the state remains in the "stopping 1" state.

At block 236, it is determined whether the state is equal to "stopping 2." If this is the case, decision block 238 is executed and, if the fdzs is less than the stopped_threshold value, the state switches to the "stopped" state (block 224). Otherwise, the velocity estimate is compared to the hysteresis value at block 240. If the velocity estimate is greater than the hysteresis value, the state becomes "starting" at block 222. If not, the state remains as "stopping 2" via block 242.

When the machine is determined to be in the "starting" state (block 244), then step 246 is executed and fdzs is compared to the in_motion_threshold value. When the fdzs is greater than this threshold value, the state is set to the "continuous motion state" (step 232). When fdzs is not greater than the in_motion_threshold value, step 248 is executed and, if the absolute value of the velocity estimate is less than the hysteresis value, then the state is switched to the "stopping 2" state, at step 242. Otherwise, the state is kept at "starting" by block 222.

Finally, if the state of the machine is "continuous motion", then step 252 is performed wherein it is determined whether the absolute value of the velocity estimate is greater than the hysteresis value. If so, step 232 is executed and the state remains as "continuous motion" (step 232). Otherwise, step 234 is executed and the state switches to "stopping 1."

Once the new state has been determined, the amount of windup compensation to be applied can be calculated. More specifically, if the state is "stopped", "stopping 1", or "stopping 2," then stop 254 is executed and the windup compensation is calculated according to the above described equation for gradually removing the compensation:

$$wcmp_k = sfp * wcmp_{k-1}$$

However, if the movable member is in either the "starting" or "continuous motion" states, then step 256 is executed and the following equation is used to gradually apply compensation, as described above:

$$wcmp_k = wcmp_{k-1} + VEST_k$$

Once the windup compensation is calculated at step 256, it is multiplied by the sign (positive or negative) of the velocity estimate, and this product is compared to one-half of the total windup W, as shown at decision step 258. If the product is greater than W/2, then step 260 is performed and the windup compensation is clamped to the value of W/2, with the polarity of the compensation being defined by the sign of the velocity estimate. In other words:

$$wcmp_k = sgn(VEST_k) * W/2$$

After the windup compensation amount has been calculated from either block 254, 256, or 260, step 262 is executed, and a total compensation amount $tcmp_k$ is determined by adding all of the various compensations which will be used for the axis. For example, if friction compensation or backlash compensation are used, these values can be added to find the sum of all compensations. Then, at block 264, the position command can be adjusted by the value of the total compensation ($tcmp_k$) by adding this value to the value that the command would have had otherwise. Then, the position command is used to control the actuator, as is known in the art, and as represented by step 266.

ii. Continuous Model

Figure 8:
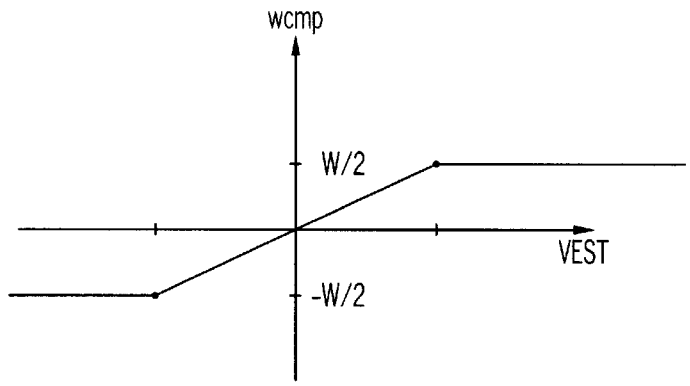
FIG. 8 is a graph illustrating an exemplary function for implementing a continuous model of windup compensation, according to the present invention.

Although an exemplary state model is described in FIG. 7, it should be understood that other methods and apparatus for applying and removing windup compensation could be used without departing from the scope of the present invention. For example, the amount of windup compensation to be applied could be a function of the velocity estimate. As shown in the example of FIG. 8, the windup compensation could follow a "ramp" function when the absolute value of the velocity estimate is less than the hysteresis. At all other times, the windup compensation would be equal to one-half of the measured lost motion W.

Figure 9:
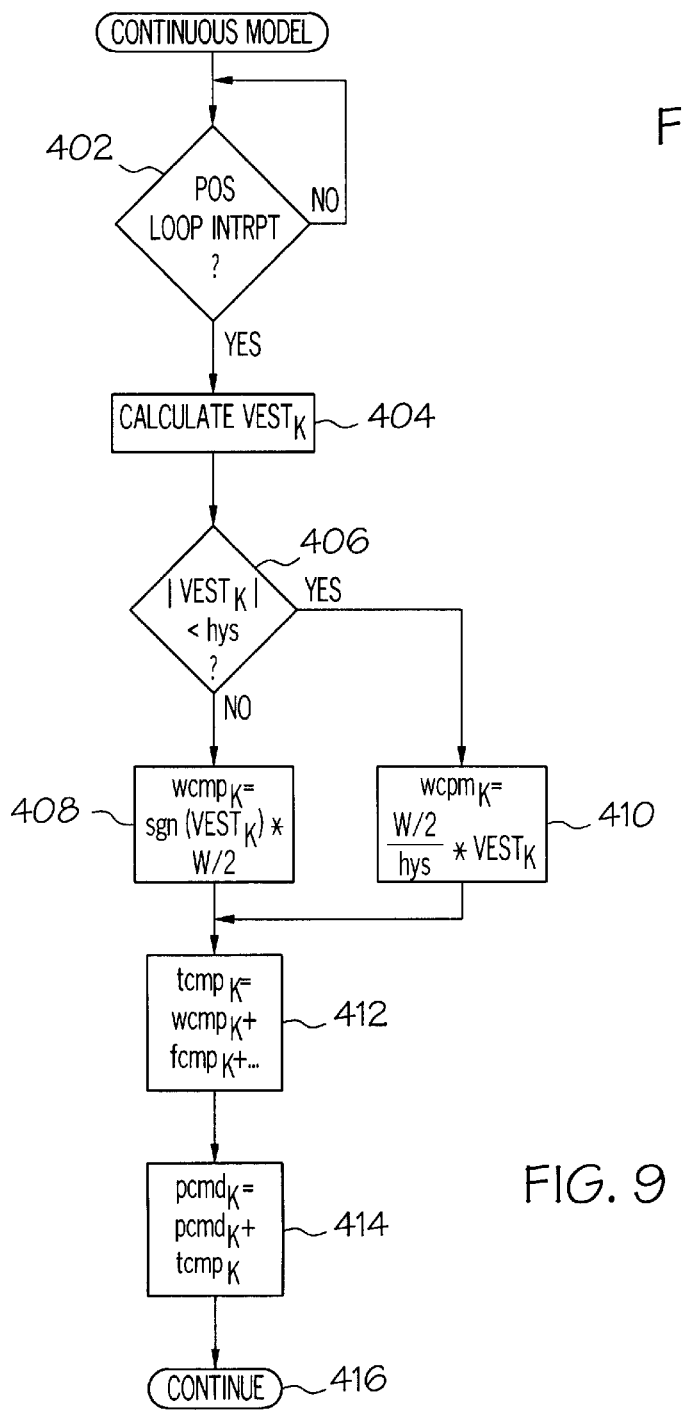
FIG. 9 is a flow diagram depicting a continuous model implementation of windup compensation, according to another exemplary embodiment of the present invention.

This "continuous" model of windup compensation could follow the steps illustrated in the flow diagram of FIG. 9. According to this example, when a position loop interrupt is detected, at step 402, the velocity estimate is calculated for the new update interval. This step, step 404, can be performed using the velocity estimate equation described above.

Once the velocity is determined, step 406 is executed and the velocity estimate is compared to a threshold value, such as the hysteresis value (hys) described above. If the absolute value of the estimated velocity is less than the hysteresis, then the "ramp" part of the function is enabled. Accordingly, the windup compensation can be calculated at step 410 by multiplying the velocity estimate by the slope of the ramp function. This slope is equal to one-half of the windup compensation divided by the hysteresis (i.e., W/2 divided by hys).

However, if the absolute value of the estimated velocity is not less than the threshold, then the magnitude of the windup compensation can be set equal to W/2, and the sign of the windup compensation can be based upon the sign of the velocity estimate. This situation is illustrated at step 408.

Once the windup compensation is calculated from either block 408 or 410, it then can be added with other compensations to get a total compensation value ($tcmp_k$). This total compensation value can then be added to the position command for appropriate adjustment thereof. These two steps are illustrated at blocks 412 and 414 of FIG. 9.

It should be understood, that other types of functions relating the windup compensation amount to the velocity could be used without departing from the scope of the invention. For example, piecewise parabolic type curves could be utilized. In addition, the following equation describes another alternative relationship for the windup compensation to be applied:

$$wcmp_k = sgn(v)*(1-e^{-r*|v|})$$

where v is the velocity, and r is a positive constant which is appropriately selected, such as through trial and error, to get the desired performance. As can be understood, r would affect the effective hysteresis velocity.

In addition, although the velocity estimate equation described above could be used, it is contemplated that other velocity measurements, calculations, and/or equations could be utilized as well.

III. Setting Up Compensations

As discussed above with respect to FIG. 4, to determine the amount of lost motion experienced during continuous motion, and thus the windup amount of the machine, a ballbar plot can be utilized. However, because non-persistent windup error and backlash error bosh appear as lost motion error on ballbar plots, it can be difficult to distinguish between the two phenomena. Accordingly, it is preferred that a "set-up" method is used for each axis to first compensate for various phenomena which affect lost motion before measuring the remaining lost motion. Once compensation is provided for the other phenomena, the remaining lost motion error apparent during continuous motion can be assumed to be due to the non-persistent portion of machine windup.

A. Bi-Directional Error Compensation

Figure 10:
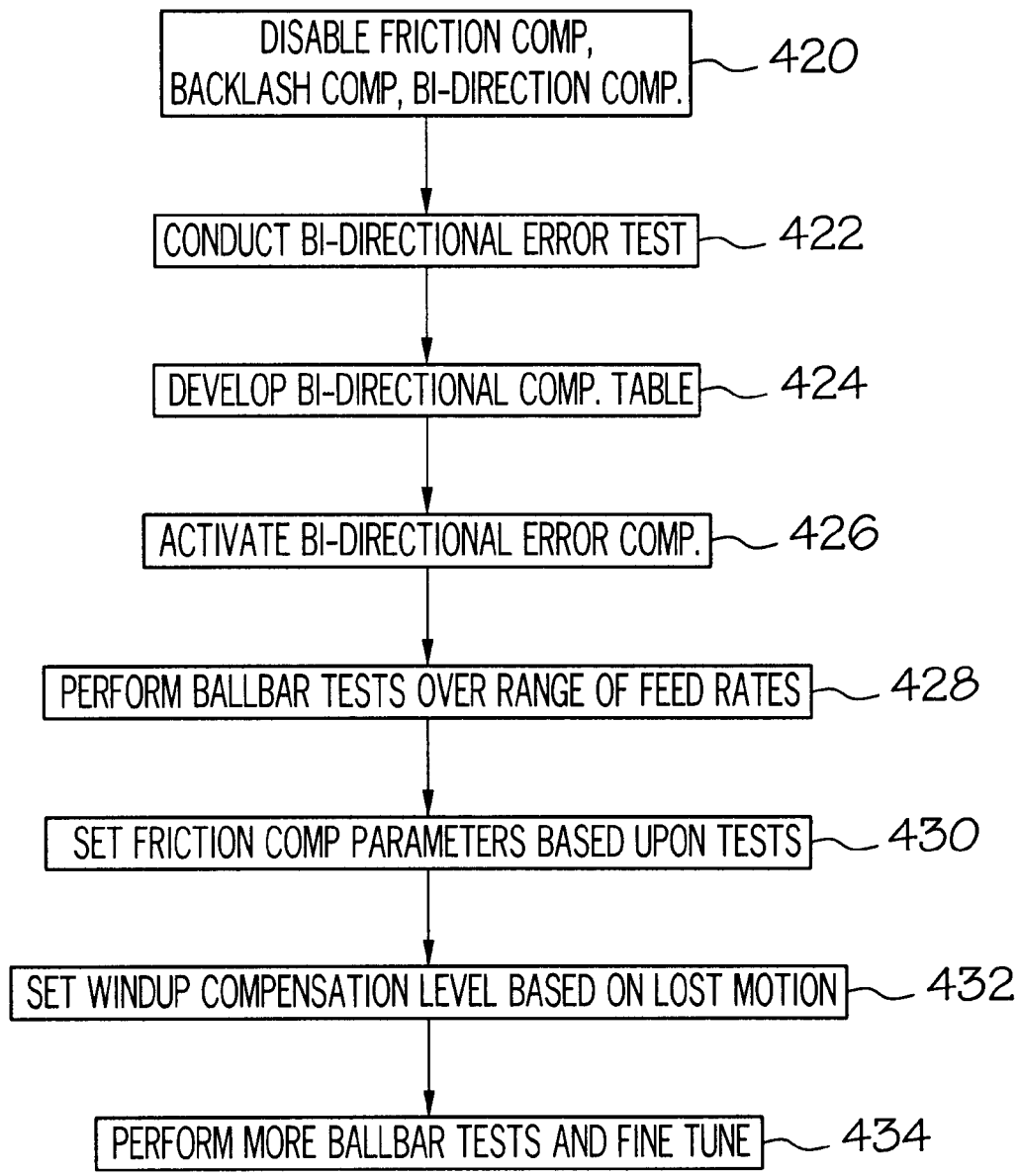
FIG. 10 is a flow diagram illustrating one preferred method for establishing the amount of windup compensation to be applied, according to the principles of the present invention.

An exemplary "set-up" method is depicted in FIG. 10. According to this method, the friction compensation, bi-directional compensation, and backlash compensation are disabled, as shown at block 420. Then, a bi-directional error test is conducted on the machine tool at step 422. As is known in the art, a bi-directional error test is performed by moving the axis of interest in increments and measuring the error between the desired (i.e., commanded position), and the actual position obtained for each increment after movement has stopped. The errors can be measured by using a laser measurement system, such as the ML10 laser measurement system, available from Renishaw, Inc. Preferably, measurements are taken for movements in both the positive and the negative direction. Then, using this data, a bi-directional error compensation table can be established, which relates position to the amount of compensation to be applied. This step is shown at block 424.

B. Friction Compensation

Once the bi-directional error compensation table is established, this compensation, which accounts for both backlash and pitch error, can be activated, (e.g., at step 426), so that machine position commands are adjusted based upon values in the table. Then, ballbar tests can be run on the machine over a variety of feedrates, and the plots from these tests examined. This is shown at step 428. Based upon these ballbar plots, values for the friction compensation parameters can be established, as illustrated at step 430.

The parameters for the friction compensation are the compensation gain, $G_2$, and the inverse compensator filter pole (ICFP). The gain $G_2$ determines the height of the friction compensation pulse and the ICFP determines the rate of decay, and thus the width, of the friction compensation applied. The ICFP is a continuous time pole and is related to a discrete time pole $d_{hp}$ by the following equation:

$$d_{hp} = e^{-ICFP*T}$$

where T is the update interval of the system.

Initial values can be established, for example, by setting the compensation gain $G_2$ at around twice the height observed on the ballbar plot for a reversal spike (such as reversal spike $E_f$ shown in FIG. 4a) during a ballbar test for a 100 mm radius circle at a feedrate of about 1000 mm/min. A typical initial value for the ICFP is around 30 radians per second. These values can then be adjusted by trial and error during successive ballbar tests until the spike at axis reversal is satisfactorily reduced.

During this trial and error process, the friction compensation parameters can be adjusted based upon the reversal spike observed after each adjustment. For example, when the gain is too low, the reversal spike is attenuated in amplitude but maintains its general shape and direction. Conversely, when the gain is too high, the reversal spike points in the opposite direction, toward the center of the circle.

When the ICFP filter pole is too large, the compensation spike is too narrow, resulting in an attenuated reversal spike. While this is the same result as the gain being too small, if the gain is incorrectly increased in this situation, a double spike will occur comprising an initial inward pointing spike and then an outward pointing spike. In this case, the filter pole is too large and the gain is too large.

On the other hand, if the ICFP filter pole selected is too small, the friction compensation spike will be too wide, resulting in an inward pointing spike. To distinguish this from the situation where the gain is too high, the width of the inward pointing spike can be examined. If the inward pointing spike is wider than the outward spike that occurs without friction compensation, then the pole is too small. However, if it is the gain that is too large, then the width of the inward spike will be about the same as the outward spike that occurs without compensation. If the pole is too small and the gain is too small, an initial outward spike followed by an inward spike will result at axis reversal.

This selection and adjustment may be affected by the selection of the velocity estimator pole VEP, discussed earlier. However, the effects of the velocity estimator pole can typically be ignored if it is selected according to the following equation: $1000*K_v/60$. Satisfactory results can then be obtained by tweaking only the gain and the ICFP filter pole based upon the resulting ballbar plots, as described above.

These trial and error processes and the selection and adjustment of the friction compensation parameters are represented at step 430 of FIG. 10.

C. Windup Compensation

Once the friction compensation and bi-directional error compensation have been applied, the amount of windup W can be determined, at step 432. As noted above, the amount of lost motion measured on the ballbar plot at axis reversal can be used for the windup parameter W. FIG. 4b illustrates an exemplary ballbar plot when bi-directional compensation and friction compensation have been applied. The remaining error W for the axis can be assumed to be due to windup in the machine. The error at axis reversal for the axis being examined can then be used as the windup compensation parameter W for that axis. For example the error $W_x$ shown in FIG. 4b could be used as the parameter W for the X axis.

The setup procedure could then be conducted on each of the other axes in the machine to set up the bi-directional error compensation, friction compensation, and windup compensation for each axis respectively.

Other methods and devices for determining the amount of windup parameter W could be used as well. For example, it is contemplated that persistent lost motion, such as is caused by backlash, could be first measured, such as through polar radial error plot. Then, this value could be subtracted from the total lost motion experienced to establish the windup parameter W.

Another alternative would be to temporarily incorporate a measuring instrument, such as a linear variable differential transformer (LVDT) or linear scale, into the control system to make axis endpoint (i.e., movable member) measurements, and to compare this measured position with the position of the motor, such as can be measured by an encoder. The encoder position would represent the desired or commanded position, and the LVDT position would represent the actual position of the movable member. More specifically, according to this method of determining non-persistent lost motion error, the motor can be moved in a positive direction and then stopped, such that persistent lost motion is removed in this direction. Then, the motor can again be moved in the positive direction and the difference between the endpoint position, as measured by the LVDT, and the motor position, as measured by the encoder, can be determined and plotted against time and/or velocity. This difference (D) should primarily comprise nonpersistent lost motion error due to windup, and, accordingly, should return to zero or "unwind" when the motor is brought to a full stop, as shown in the exemplary plot of FIG. 13. The maximum value of this lost motion error can be used as the windup parameter W. Also, the velocity at which the error begins to return to zero can be used to set the velocity hysteresis value.

Figure 13:
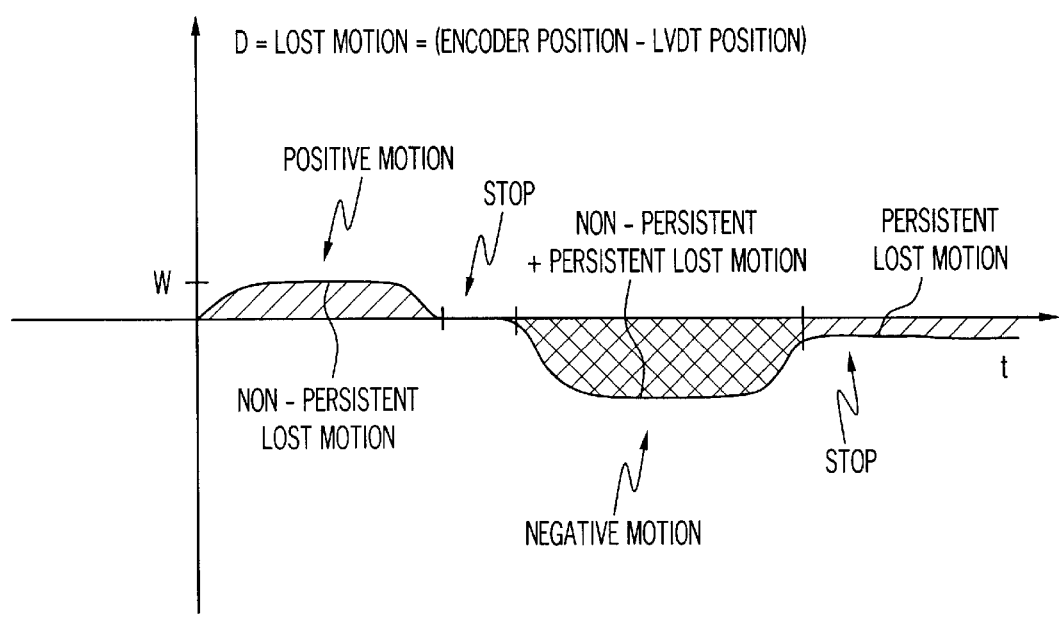
FIG. 13 is an exemplary plot of the difference between motor position and movable member position versus time, as can be used to determine a windup compensation value according to the present invention.

After a full stop, the motor can then be reversed and moved in the negative direction. Again, the difference (D) between the LVDT measurement and the encoder measurement can be plotted against time (t) and/or motor velocity, as shown in FIG. 13. The absolute value of the difference (D) experienced in the negative direction should be greater than that experienced in the positive direction because persistent lost motion, due to backlash for example, will manifest itself upon such a motor reversal. Accordingly, when the motor comes to a stop after moving in the negative direction, some persistent lost motion error should remain. This effect is also shown in the exemplary plot of FIG. 13.

D. Fine Tuning

After all of the compensation parameters have been established and applied, it may be desirable to fine tune the system by conducting additional ballbar tests. This step is depicted at block 434.

Alternatively, it may be desirable to determine if an additional backlash value needs to be established. For example, if the bi-directional error compensation table has already been established, it might be desirable to skip steps 422 and 424. However, if the system backlash changed somewhat since the establishment of the table, an additional value may need to be added to the values in the table to effectively compensate for this new backlash. This new backlash can be detected, for example, through the use of a dial indicator after the bi-directional error compensation is enabled. More specifically, the axis could be moved in a positive direction toward the dial indicator until a deflection is shown on the dial indicator gauge. After the dial indicator shows some deflection, the axis should be fully stopped (for example, by waiting a number of seconds so as to ensure a complete stop has occurred). Then, the axis can be moved away from the dial indicator in a negative direction a slight amount and then fully stopped, such that some portion of the original deflection remains on the indicator, but so that backlash in this direction is initially removed. Then the axis can be moved further in this negative direction so that no deflection is shown on the indicator (i.e., moved off the gauge) and again fully stopped. Finally, the axis can be commanded to move in the positive direction and back to the position it was in before it moved off the gauge. Any difference in the gauge readings between when the axis was moved off the gauge and then moved back to the original position would indicate additional lost motion for which additional compensation should be provided, such as by adjusting the bi-directional error compensation table.

Although FIG. 10 depicts one method for determining the amount of windup compensation to be applied, it is contemplated that other methods could be utilized as well, without departing from the scope of the invention. For example, it is contemplated that position commands and resulting positions could be measured and recorded during the continuous motion of the movable member. The lost motion measured during this continuous motion could then be used to determine the windup compensation parameter.

IV. Implementation of Windup Compensation in a Machine Tool System

Figure 11A:
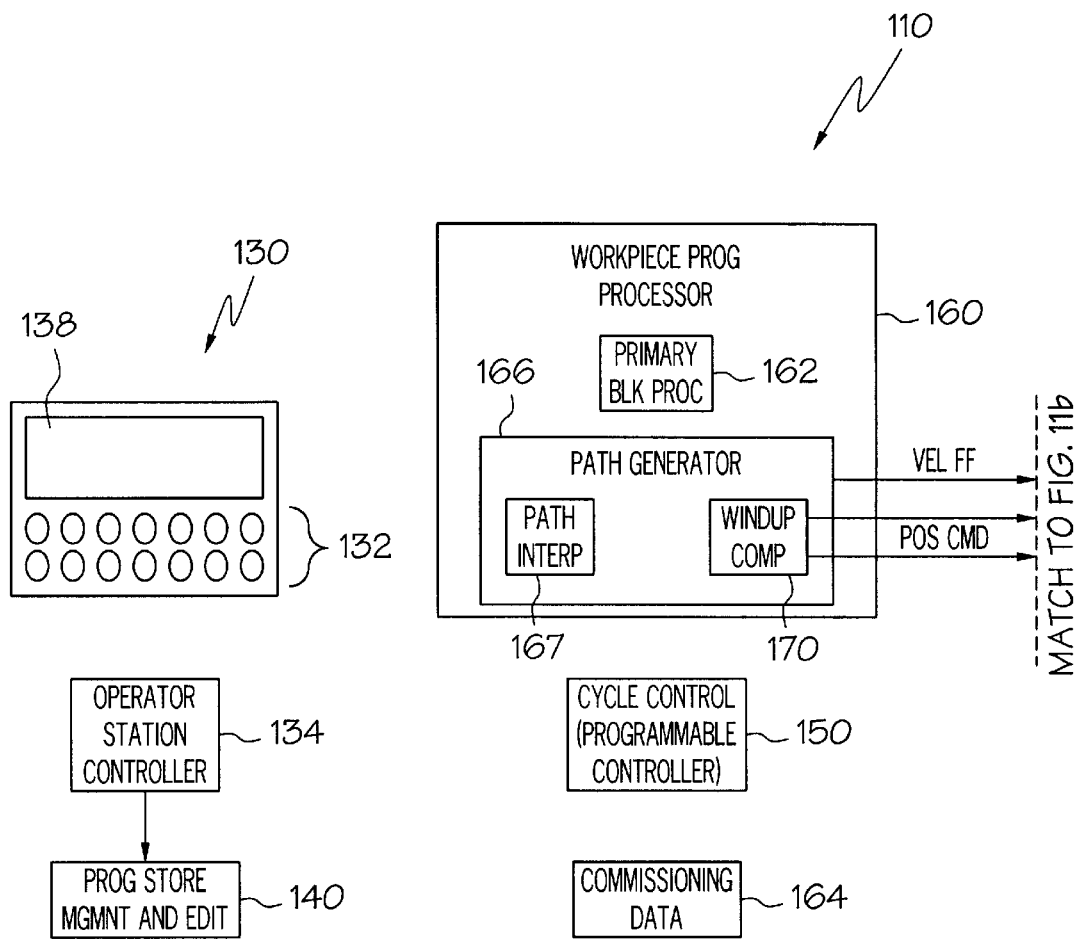
FIGS. 11a and 11b are a block diagram of a controller implementing windup compensation, according to one preferred application of the present invention.
Figure 11B:
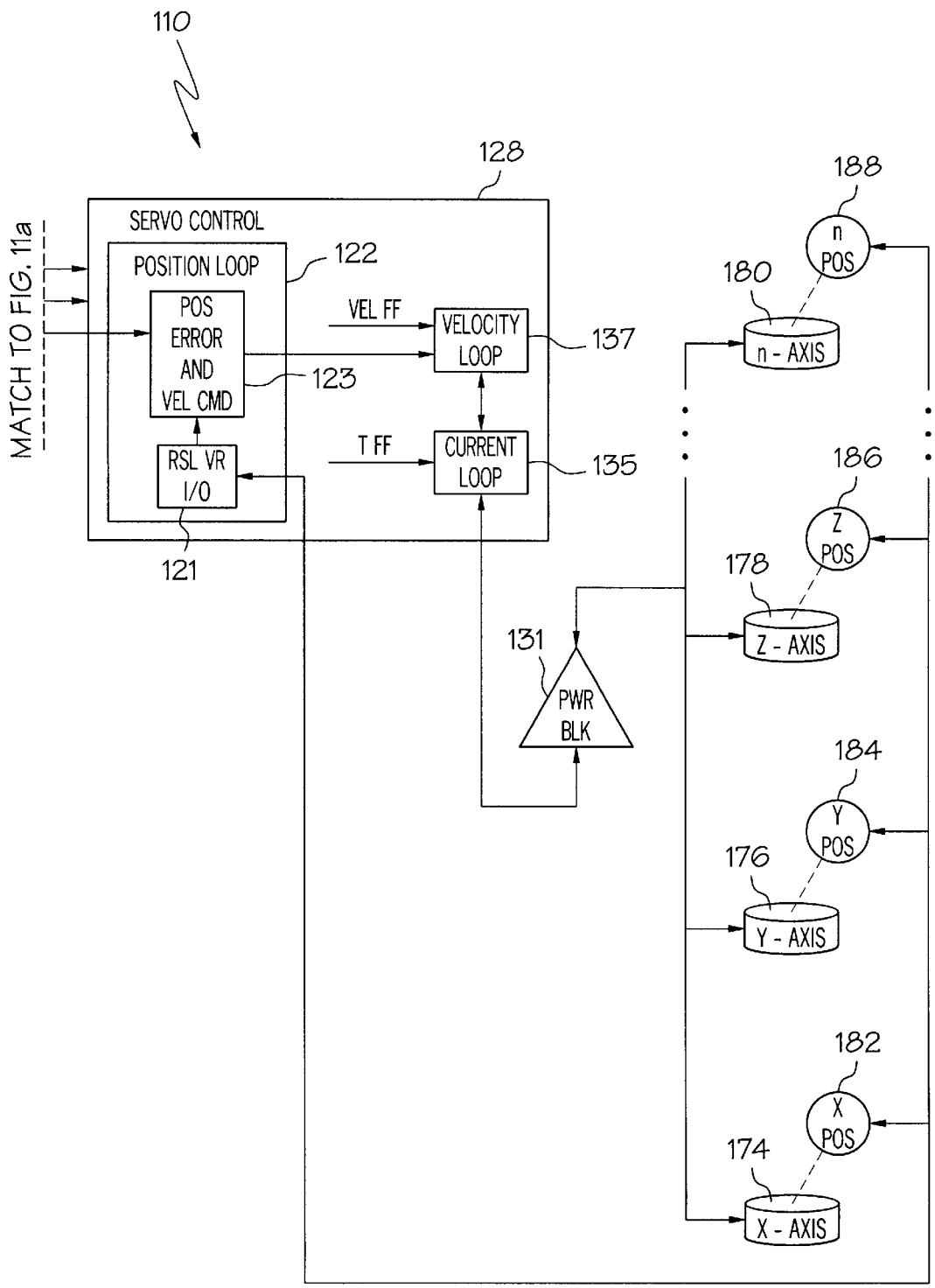

The windup compensation of the present invention can be implemented in the exemplary machine tool system as depicted in FIG. 11. Position commands for servomechanism control can be generated, for example, by a computer numerical control (CNC) 110 in response to input data supplied by, for example, a numerical control workpiece program. The CNC 110 can include an operator or user interface unit 130, a program storage and edit unit 140, a machine cycle control unit 150, a workpiece program processor 160, a commissioning data store unit 164, and a servomechanism control unit 128.

The operator interface unit 130 preferably includes a display device 138 such as a CRT or other alphanumeric display device, a manual data entry device such as a keyboard 132, and an operator station controller 134. Data can be entered manually from the operator interface unit 130 to command machine operation.

The CNC 110 can control the machine tool by execution of workpiece programs which comprise blocks of instructions containing data defining position axis coordinates, feed rates, cycle control codes, and other functions. These programs can conform to a standard programming convention, such as EIA RS 274 for example. Workpiece programs can be executed from local CNC storage by loading the program through a bulk data transfer device, such as a tape reader or data communication interface, for example. The program loading may be initiated by user selections made through the interface unit 130.

The workpiece programs can be executed under the control of the program processor 160. The instructions of the workpiece programs can be decoded by the block processor 162 to extract the programmed data and to initiate machine operations. The data required to control motion can include coordinate data specifying desired positions in coordinate axes and information defining desired velocity and motion types. For example, the motion type might be linear or circular. The workpiece program data that is required to produce servo controlled motion is passed to the path generator 166, which preferably includes path point interpolation routines 167 to produce coordinate axis position commands for each position command update interval, as well as to produce feedforward values. Both the position commands and the feedforward commands are fed from the path generator 166 to the servo controller 128. The position commands produced by the path generator 166 for the various update intervals for the axis (X, Y, Z . . . N) reflect the rate of change of position as defined by the programmed coordinates, feed rates, and cycle commands. With respect to feedforward commands, the path generator 166 preferably provides velocity feedforward commands and torque feedforward commands to the servo controller 128. The torque feedforward commands implement acceleration feedforward when applied to the servo controller 128.

The path generator 166 can also include windup compensation routines, such as indicated at 170, which generate values used to implement compensation for the effects of windup in the compliant elements of the machine tool system. Preferably, the windup compensation routines 170 adjust the position commands produced by the path point interpolations routines 167, according to the methods described above. In addition to windup compensation, other compensation values could be added to the position commands. For example, friction compensation values and/or backlash compensation values could be added to the position commands which are produced by the path point interpolation routines 167.

The commissioning data store 164 contains values for use by the windup compensation algorithm 170, such as for example, the velocity estimate filter pole (VEP), and windup level W. If other compensations are used, the data store 164 would also contain the required values associated with these compensations.

The servomechanism controller 128 can effect closed loop control of the machine member actuators, such as motors 174, 176, 178, and 180 in response to the commands generated by the path generator processor 166. The position of the actuators can be measured by position transducers 182, 184, 186, and 188, which can be mechanically driven by the respective motors 174, 176, 178, and 180.

The servomechanism controller 128 can include position loop control 122, velocity loop control 137, and current loop control 135. The position loop control 122 subtracts the instantaneous actual position of the movable member, as detected by the transducers, from the commanded position (preferably adjusted by the windup compensator 170) to produce a position loop error signal. Then, the position loop error is multiplied by a proportional gain of the position loop control 122 to produce a velocity command. More specifically, the position error and velocity command generator 123 of the position loop control 122 determines the difference between command positions and measured positions, and scales the resulting position loop errors by the position loop gain to produce the velocity commands.

Also contained within the position loop control 122 are input/output interface circuits 121 for controlling the transducers 182, 184, 186, and 188. For example, if resolvers are used as the transducers, the I/O interface circuits 121 provide the resolver excitation signals and receive the resolver output signals.

The velocity loop control 137 receives the velocity command from the position loop control 122 and sums this with the velocity feedforward value. From this sum is subtracted the actual velocity of the movable members to produce velocity loop error. The velocity loop error is then used in a compensator algorithm to produce a torque command value.

The torque command value, and the torque feedforward command, are used to produce a current command signal which determines the magnitude of the current to be delivered to the motors 174, 176, 178, and 180. To achieve this, the torque commands are preferably scaled by estimated values of the torque constants of the actuators. The current command signals are compared to measured motor currents to deliver a required voltage which is fed to a power block 131 which contains devices for delivering voltage across the motors.

While a specific arrangement for control of the machine tool has been described, it is contemplated that other arrangements could be utilized as alternatives without departing from the scope of the invention. For example, the velocity loop control 137 and current loop control 135 could be separated from the position loop control 122 and may be included as elements of the actuator controllers. Furthermore, velocity loop control and current loop control can be implemented without including external torque commands or current commands. In addition, while the windup compensation has been described as being implemented within the path generator 166, it is contemplated that the compensation could be implemented elsewhere, such as within the servo control 128, if provided as a separate control. Moreover, while windup compensation has been described with application to a machine tool system, it should be understood that the compensation can equally be applied to any sort of motion control machine, such as transfer line equipment, industrial robots, EDM (Electrical Discharge Machining) systems, industrial automation equipment, and injection molding machines, for example.

Figure 12:
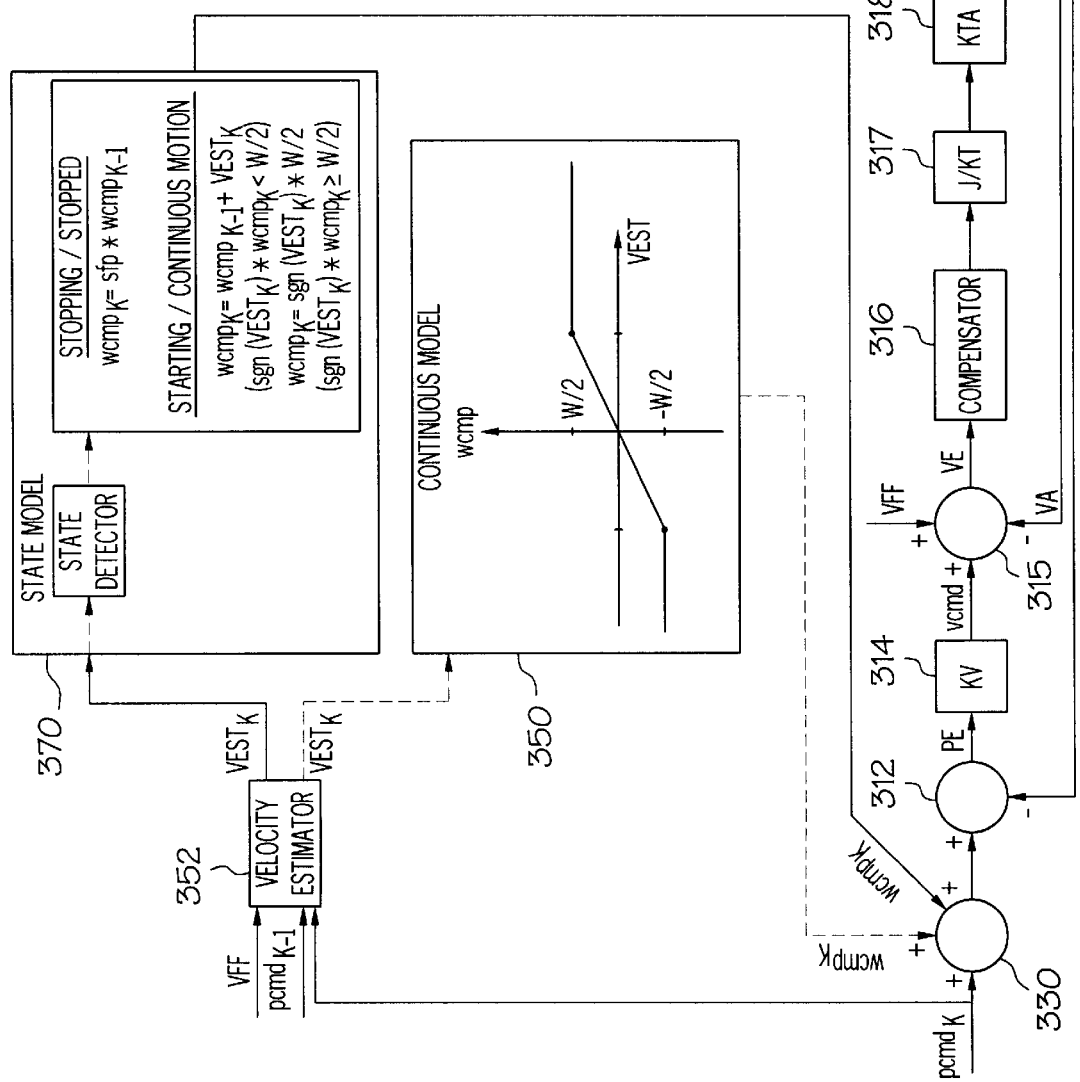
FIG. 12 is a functional block diagram of a servomechanism controller implementing windup compensation, according to another preferred application of the present invention.

FIG. 12 is a functional block diagram illustrating windup compensation implemented within a servomechanism control. In this exemplary embodiment, a velocity estimate is produced by the velocity estimator 352 based upon the position command and the velocity feedforward command. This velocity estimate is then fed to either a state model windup compensator 370 or a continuous model windup compensator 350. Both models are shown in the example of FIG. 12. Based upon the velocity or the state determined, the windup compensators 370 and 350 will produce a position compensation value. At summing junction 330, the position compensation is added to the position command. The compensated position command is then applied to a summing junction 312 where position loop error PE is determined as the difference between the compensated commanded position and the actual position of the movable member. The position loop error PE is multiplied by the position loop gain KV, at block 314, to implement proportional gain of the position loop to produce a velocity command component. Then, at summing junction 315, the position loop velocity component is combined with velocity feedforward values and the actual velocity VA of the controlled element to produce a velocity loop error VE. The velocity loop error VE is when used in a compensator algorithm 316 to produce a torque command. The torque command is then scaled, at block 317 by an estimated actuator torque constant KT and an estimated total moment of inertia J of the actuator and load, to produce a current command. Then, the current command is provided to a closed loop current controller 318.

This motor torque is then summed, at block 319, with all other torques opposing the torque applied by the current command, such as the torques attributable to frictional forces acting on the motor and the load. These torques are represented by block 322. The net torque produced by the motor acts upon a mechanical load which affects the acceleration achieved by the motor.

Block 320A represents the transfer function of the mechanical system (G(s)), and block 320B represents the relationship between actual acceleration and actual velocity. Finally, the actual velocity is integrated, at block 321, to produce the actual position of the movable member.

While the functional block diagram of FIG. 12 represents a continuous time functional representation, it should be understood that any of the control functions can be implemented using sampled data techniques in which measured values are periodically sampled and command values are periodically produced according to predetermined update intervals. Also, it should be understood that windup compensation could be implemented according to a number of other structures, configurations, and methods without departing from the scope of the present invention.

When applying friction compensation, backlash compensation, and windup compensation according to the above description, positioning errors can be minimized. The axis reversal spikes $E_f$ shown in FIG. 4a are minimized due to the friction compensation and lost motion LM is minimized due to the combination of the backlash compensation and windup compensation. In particular, the lost motion $W_x$ experienced during continuous motion, and shown in FIG. 4b, can be significantly reduced due to the present invention. Accordingly, the actual response 92 of the machine will be significantly closer to the desired response when the windup compensation of the present invention is applied.

The foregoing description of the preferred embodiments of the invention has been presented for purposes of illustration and description. It is not intended to be exhaustive or to limit the invention to the precise form disclosed, and modifications and variations are possible in light of the above teachings. For example, it is contemplated that the windup W could be automatically and periodically measured "on-line" during machine operation, and the measured value used to adjust the position command.

Thus, it should be understood that the embodiments and examples have been chosen and described in order to illustrate the principals of the invention and its practical application to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A method of compensating for lost motion in a machine having a movable member controlled by an actuator, comprising:

producing a position command which is representative of the desired position of the movable member;

moving the movable member in response to the position command;

determining a windup error value associated with the machine by measuring a variation between the desired position and the actual position of the movable member that occurs when the movable member is in motion;

providing actuator commands for control of the actuator movement; and when the movable member is in motion, adding a windup compensation amount to the actuator commands to adjust the control of the actuator movement, wherein the windup compensation amount is based upon the windup error value determined.

2. The method as recited in claim 1, further comprising the step of subsequently removing the windup compensation amount from the actuator commands when the movable member is stopped.

3. The method as recited in claim 2, wherein the movable member is determined to be in motion or stopped based upon a velocity estimate.

4. The method as recited in claim 3, wherein the velocity estimate is compared to a threshold value to determine whether the movable member is in motion or stopped.

5. The method as recited in claim 1, further comprising:
compensating for backlash errors associated with the machine.

6. The method as recited in claim 1, further comprising:
measuring backlash error associated with the machine, wherein the windup error value is determined by subtracting the measured backlash error from the measured variation.

7. A method of compensating for lost motion in a machine having a movable member controlled by an actuator, comprising:

compensating for persistent lost motion errors associated with the machine;

determining a non-persistent lost motion error associated with the machine by measuring lost motion remaining after the step of compensating for persistent lost motion;

when the movable member is in motion, applying a windup compensation value to an actuator control command, wherein the windup compensation value is based upon the non-persistent lost motion error; and subsequently removing the windup compensation value from the actuator control command when the movable member is stopped.

8. The method as recited in claim 7, wherein the step of compensating for persistent lost motion comprises:
compensating for backlash associated with the machine.

9. The method as recited in claim 8, further comprising:
compensating for transient errors due to step changes in friction which occur at reversal of direction of the movable member.

10. The method as recited in claim 9, wherein the step of compensating for transient errors comprises:

establishing a friction compensation value based upon the positioning error spike measured at reversal of the movable member;

detecting if the movable member is reversing motion; and when a reversal is detected, applying the friction compensation value to the actuator control command.

11. The method as recited in claim 7, wherein the step of compensating for persistent lost motion comprises:

moving the movable member in response to a plurality of commanded positions;

for each commanded position, measuring the difference between the actual position of the movable member and the commanded position after the movable member has come to a stop; and establishing a compensation table based upon the measurements.

12. The method as recited in claim 11, wherein the step of establishing a compensation table comprises:

recording each of the plurality of commanded positions in a database; and recording each of the corresponding measured differences in the database.

13. The method as recited in claim 7, further comprising:
monitoring the state of movement of the movable member to determine appropriate timing for application of the windup compensation value.

14. The method as recited in claim 13, wherein the monitoring step comprises:

determining whether the movable member is in motion or stopped based upon the velocity of the movable member.

15. The method as recited in claim 14, wherein the movable member is determined to be in motion or stopped based upon an estimated velocity of the movable member.

16. The method as recited in claim 15, wherein the movable member is determined to be in motion or stopped by comparing the estimated velocity of the movable member to a predetermined threshold value.

17. The method as recited in claim 14, wherein the movable member is determined to be in motion or stopped based upon the amount of time that the velocity of the movable member exceeds a predetermined threshold value.

18. An apparatus for compensating for lost motion errors in a machine having a movable member controlled by an actuator, comprising:

a position command generator situated in communication with the actuator to apply position commands to the actuator;

an movable member motion detector; and a windup compensator arranged in communication with the position command generator and the motion detector, wherein the windup compensator is adapted to adjust the position commands based upon a predetermined windup value when the movable member is in motion, wherein the predetermined windup value is based upon positioning error measured while the member was in motion.

19. The apparatus as recited in claim 18, wherein the windup compensator includes at least one equation associating the velocity of the movable member to the windup compensation value to be applied.

20. The apparatus as recited in claim 18, wherein the motion detector comprises:

a velocity estimator in communication with the windup compensator to control the amount of adjustment provided by the windup compensator based upon an estimate of the velocity of the movable member.

21. The apparatus as recited in claim 20, wherein the motion detector further comprises:

a motion state determination unit in communication with the velocity estimator to determine the motion state of the movable member based upon the velocity estimate for control of the amount of adjustment provided by the windup compensator.

22. The apparatus as recited in claim 18, further comprising:

a workpiece connected to the movable member; and a machine tool movable relative to the workpiece.

23. A method for compensating for lost motion in a machine having a movable member controlled by a motor, comprising:

moving the motor according to a plurality of desired positions, the movement of the motor resulting in movement of the movable member;

for each desired position, waiting until the movable member has come to a stop, and determining the difference between each desired position and the actual position of the movable member;

establishing error compensation values based upon the differences determined;

moving the movable member in a continuous motion along a predetermined desired path by applying a series of commands to the motor, wherein the series of commands is compensated based upon the error compensation values;

measuring in-motion variation between the predetermined desired path and the actual path of the member, wherein the in-motion variation occurs when the movable member is in motion;

establishing a windup compensation value based upon the in-motion variation; and adjusting position commands applied to the motor based upon the windup compensation value.

24. The method as recited in claim 23, further comprising:

moving the movable member in a continuous reversal motion, wherein the continuous reversal motion includes at least one reversal of direction of the movable member;

measuring the amount of transient error due to step changes in friction upon the reversal of direction of the movable member;

establishing a friction compensation value based upon the transient error; and adjusting the series of commands based upon the friction compensation value.

25. The method as recited in claim 23, wherein the in-motion variation is measured using a ballbar plot.

26. The method as recited in claim 23, wherein the step of adjusting position commands comprises:

adding increasing amounts to successive position commands when the velocity of the movable member rises above a threshold value, wherein the increasing amounts cannot exceed the windup compensation value; and adding decreasing amounts to successive position commands when the velocity of the movable member falls below a threshold value.

27. The method as recited in claim 26, wherein the velocity of the movable member is determined by estimation.

* * * * *